(12) United States Patent
Takimoto et al.

(10) Patent No.: US 11,698,540 B2
(45) Date of Patent: Jul. 11, 2023

(54) LENS DRIVE DEVICE, CAMERA MODULE, AND CAMERA MOUNT DEVICE

(71) Applicants: Yukihiro Takimoto, Tokyo (JP); Keiichi Sato, Tokyo (JP); Ichiro Hayashi, Tokyo (JP)

(72) Inventors: Yukihiro Takimoto, Tokyo (JP); Keiichi Sato, Tokyo (JP); Ichiro Hayashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 348 days.

(21) Appl. No.: 16/635,570

(22) PCT Filed: Jul. 30, 2018

(86) PCT No.: PCT/JP2018/028461
§ 371 (c)(1),
(2) Date: Jan. 31, 2020

(87) PCT Pub. No.: WO2019/026845
PCT Pub. Date: Feb. 7, 2019

(65) Prior Publication Data
US 2020/0241314 A1 Jul. 30, 2020

(30) Foreign Application Priority Data
Jul. 31, 2017 (JP) ................................ 2017-148084

(51) Int. Cl.
*G02B 27/64* (2006.01)
*G02B 7/09* (2021.01)
(Continued)

(52) U.S. Cl.
CPC ............. *G02B 27/646* (2013.01); *G02B 7/09* (2013.01); *G03B 5/00* (2013.01); *G03B 13/34* (2013.01); *G03B 2205/0007* (2013.01)

(58) Field of Classification Search
CPC .......... G02B 27/646; G02B 7/09; G03B 5/02; G03B 2205/0015; G03B 2205/0069;
(Continued)

(56) References Cited

U.S. PATENT DOCUMENTS

2013/0005082 A1   1/2013   Kim et al.
2013/0050828 A1   2/2013   Sato et al.
(Continued)

FOREIGN PATENT DOCUMENTS

EP     3168667 A1    5/2017
JP    2013210550 A   10/2013
(Continued)

OTHER PUBLICATIONS

Extended European Search Report dated Mar. 26, 2021.
International Search Report from International Application No. PCT/JP2018/028461 dated Oct. 30, 2018.

*Primary Examiner* — Marin Pichler
(74) *Attorney, Agent, or Firm* — Shih IP Law Group, PLLC.

(57) ABSTRACT

A lens drive device comprises: a fixing part disposed away from the movable part; a cover for covering the movable part in the direction of an optical axis; and suspension wires for supporting the movable part relative to the fixing part, one ends of the suspension wires being secured to the fixing part and the other ends being secured to the movable part. The movable part is configured so as to be provided with: a damper material disposed so as to come in contact with the suspension wires; a stopper protrusion provided near a portion of the light-receiving-side surface where the other ends of the suspension wires are secured, the tip end of the stopper protrusion facing the inner surface of the cover in the direction of the optical axis; and a flow-stopper part stopping a flow of the damper flowing.

4 Claims, 21 Drawing Sheets

(51) Int. Cl.
*G03B 5/00* (2021.01)
*G03B 13/34* (2021.01)

(58) Field of Classification Search
CPC ........ G03B 3/10; G03B 5/00; H04N 5/23287; H04N 5/2254; H04N 5/2257; H04N 5/2253
See application file for complete search history.

(56) References Cited

U.S. PATENT DOCUMENTS

| | | | |
|---|---|---|---|
| 2016/0139425 A1 | 5/2016 | Park | |
| 2016/0209621 A1 | 7/2016 | Park | |
| 2016/0241787 A1 | 8/2016 | Sekimoto | |
| 2017/0082829 A1* | 3/2017 | Kudo | G02B 7/04 |
| 2018/0246296 A1* | 8/2018 | Sugawara | G02B 27/646 |

FOREIGN PATENT DOCUMENTS

| | | | | |
|---|---|---|---|---|
| JP | 2016035599 A | 3/2016 | | |
| KR | 10-2016-0148281 A | 12/2016 | | |
| WO | 2015045527 A1 | 4/2015 | | |
| WO | WO-2015174028 A1 * | 11/2015 | ........... | G02B 27/646 |
| WO | WO-2016103697 A1 * | 6/2016 | ........... | G02B 13/005 |
| WO | 2017078364 A1 | 5/2017 | | |

* cited by examiner

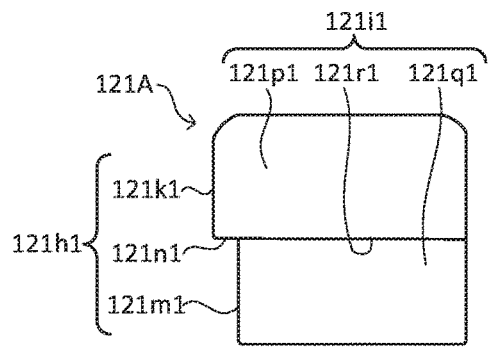
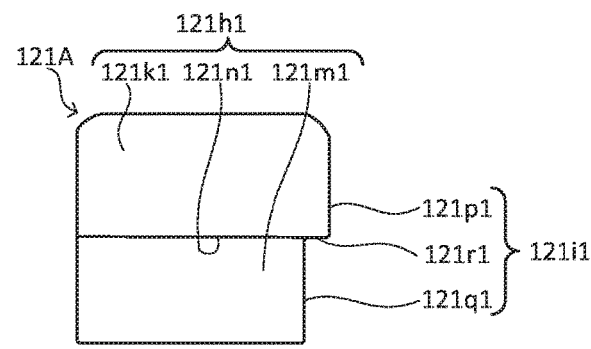
FIG. 13A　　　　　　　FIG. 13B
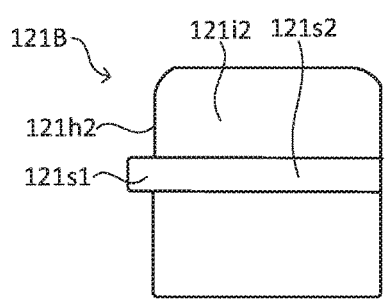
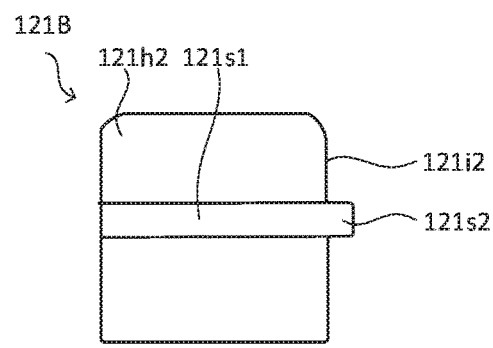
FIG. 14A　　　　　　　FIG. 14B

LENS DRIVE DEVICE, CAMERA MODULE, AND CAMERA MOUNT DEVICE

TECHNICAL FIELD

The present invention relates to a lens driving device, a camera module, and a camera mounting apparatus.

BACKGROUND ART

Conventionally, various lens holder driving apparatuses for capturing a clear image by preventing blurring on the imaging surface even with hand shake (vibration) when capturing an image of a still picture have been proposed.

For example, PTL 1 discloses a hand shake correction device in which a permanent magnet for an auto-focus (AF) lens driving device serves also as a permanent magnet for a hand shake correction device for the purpose of achieving reduction in size and height.

In the hand shake correction device disclosed in PTL 1, an OIS fixing part is disposed on the rear side of an OIS movable part serving also as an auto-focusing lens driving device in such a manner that the OIS fixing part is apart from the OIS movable part on one side in the optical axis direction. One ends of (lower ends) a plurality of suspension wires are fixed at the outer periphery part of the OIS fixing part. The other ends (upper ends) of the suspension wires are firmly fixed to the OIS movable part.

Specifically, in the hand shake correction device disclosed in PTL 1, the one ends (lower ends) of the suspension wires are fixed at the four corners of the coil substrate for holding the OIS coil in the OIS fixing part. In addition, at the surface (front side surface) on the other side of the magnet holder in the OIS movable part in the optical axis direction, a stopper protrusion is provided around a portion where the other end of each suspension wire is fixed. The tip end surface of such a stopper protrusion faces the inner surface of the cover in the optical axis direction with a predetermined gap therebetween. With this configuration, displacement of the OIS movable part to the other side in the optical axis direction is limited to the range of the above-mentioned gap.

CITATION LIST

Patent Literature

PTL 1
Japanese Patent Application Laid-Open No. 2016-35599

SUMMARY OF INVENTION

Technical Problem

Further, in the above-described hand shake correction device disclosed in PTL 1, a damper is disposed to surround each suspension wire in the movable part. Such a damper suppresses generation of unnecessary resonance (high-order resonance mode) of each suspension wire. However, when this damper moves in the optical axis direction and adheres to the tip end surface of the stopper protrusion and the inner surface of the cover, the adhered damper may become a resistance to the displacement of the OIS movable part in shake correction, and the accuracy of the shake correction may be reduced.

An object of the present invention is to provide a lens driving device, a camera module, and a camera mounting apparatus in which a damper less easily adheres to a tip end surface of a stopper protrusion.

Solution to Problem

A lens driving device according to an aspect of the present invention is configured to correct a shake by moving a movable part holding a lens barrel in a direction orthogonal to an optical axis. The lens driving device includes a fixing part disposed away from the movable part on an imaging side in an optical axis direction, a cover configured to cover the movable part at least on a light reception side in the optical axis direction, and a plurality of suspension wires configured to support the movable part with respect to the fixing part such that the movable part is displaceable in the direction orthogonal to the optical axis, each of the plurality of suspension wires extending along the optical axis direction such that a first end of the suspension wire is fixed to the fixing part and that a second end of the suspension wire is fixed to the movable part. The movable part includes a damper composed of a viscous fluid and disposed so as to make contact with the plurality of suspension wires, a stopper protrusion provided on a surface on the light reception side such that the stopper protrusion protrudes in the optical axis direction in a region near a portion where the second end of the suspension wire is fixed and that an end of the stopper protrusion faces an inner surface of the cover in the optical axis direction, and a flow stopper part capable of stopping a flow of the damper flowing toward the end of the stopper protrusion.

A camera module according to an aspect of the present invention includes the lens driving device, a lens part that is held by the movable part of the lens driving device through a lens barrel, and an image pickup part configured to pick up a subject image imaged by the lens part.

A camera mounting apparatus according to an aspect of the present invention that is an information apparatus or a transporting apparatus includes the camera module, and a control part configured to process image information obtained by the camera module.

Advantageous Effects of Invention

According to the present invention, it is possible to provide a lens driving device, a camera module, and a camera mounting apparatus in which a damper less easily adheres to a tip end surface of a stopper protrusion.

BRIEF DESCRIPTION OF DRAWINGS

FIGS. 13A and 13B are drawings for describing a flow stopper part of modification 1, FIG. 13A is a schematic view of stopper protrusion as viewed from a direction of arrow $A_1$ of FIG. 12, and FIG. 13B is a schematic view of stopper protrusion as viewed from a direction of arrow $A_2$ of FIG. 12;

FIGS. 14A and 14B are drawings for describing a flow stopper part of modification 2, FIG. 14A is a schematic view of the stopper protrusion as viewed from the direction of arrow $A_1$ of FIG. 12, and FIG. 14B is a schematic view of the stopper protrusion as viewed from the direction of arrow $A_2$ of FIG. 12;

FIG. 15A is a schematic view of the stopper protrusion as viewed from the direction of arrow $A_1$ of FIG. 12, and FIG. 15B is a schematic view of the stopper protrusion as viewed from the direction of arrow $A_2$ of FIG. 12;

FIG. 16 are drawings for describing a flow stopper part of modification 4.

DESCRIPTION OF EMBODIMENTS

Embodiments of the present invention are described below with reference to the accompanying drawings.

Embodiment 1

Figure 1A:
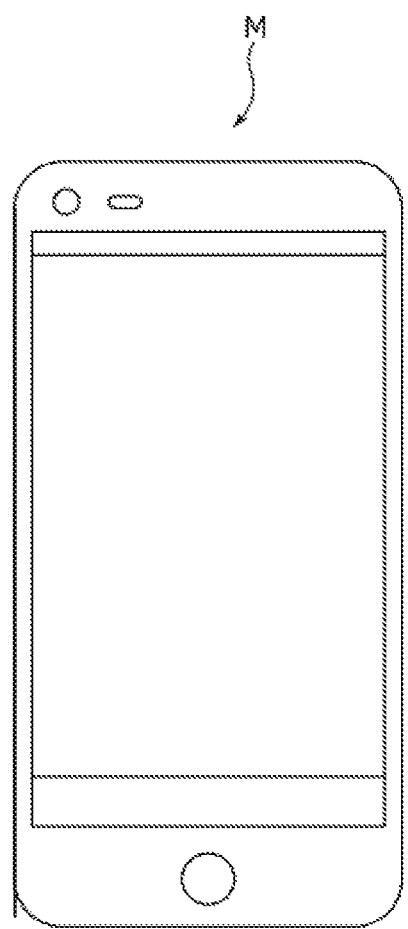
FIGS. 1A and 1B illustrate a smartphone in which a camera module according to an embodiment of the present invention is mounted.
Figure 1B:
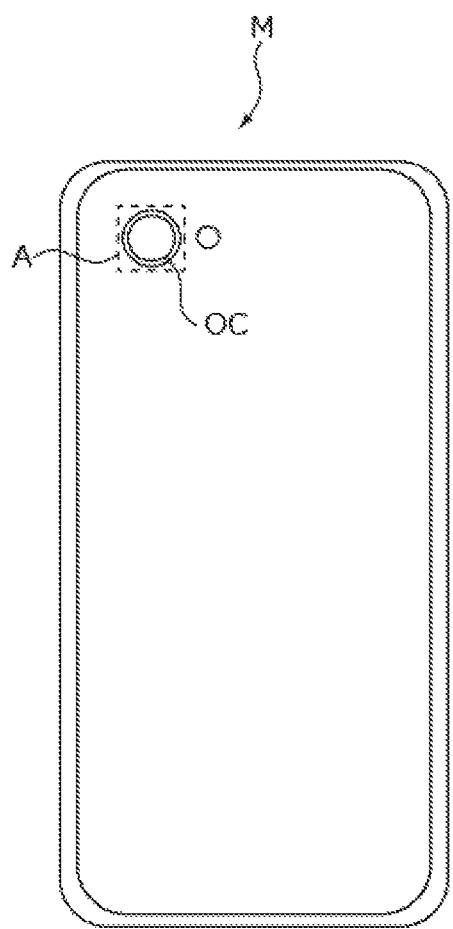
Figure 2:
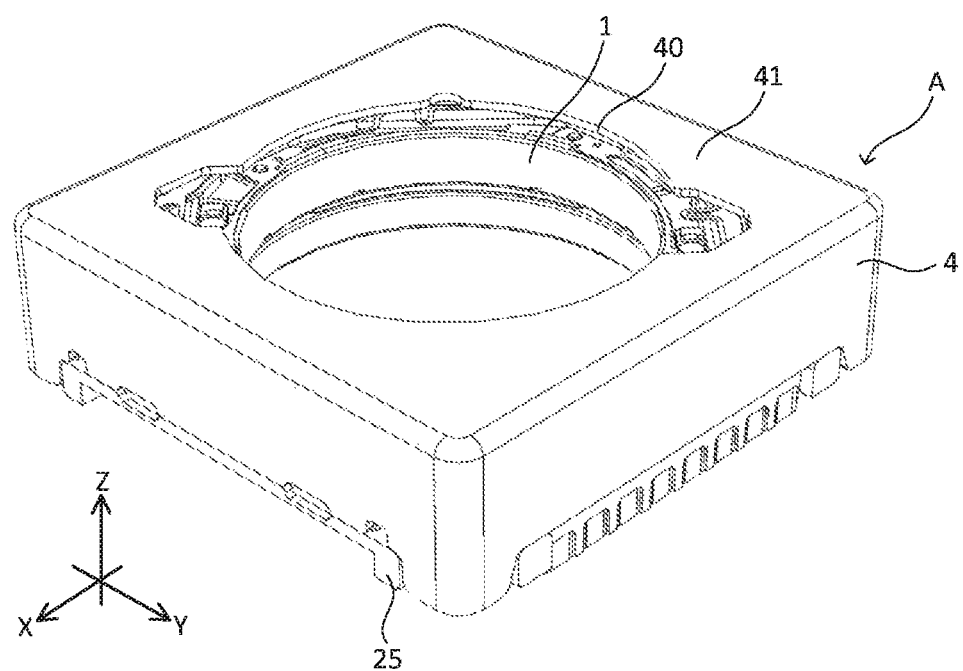
FIG. 2 is a perspective view of an external appearance of the camera module.
Figure 3:
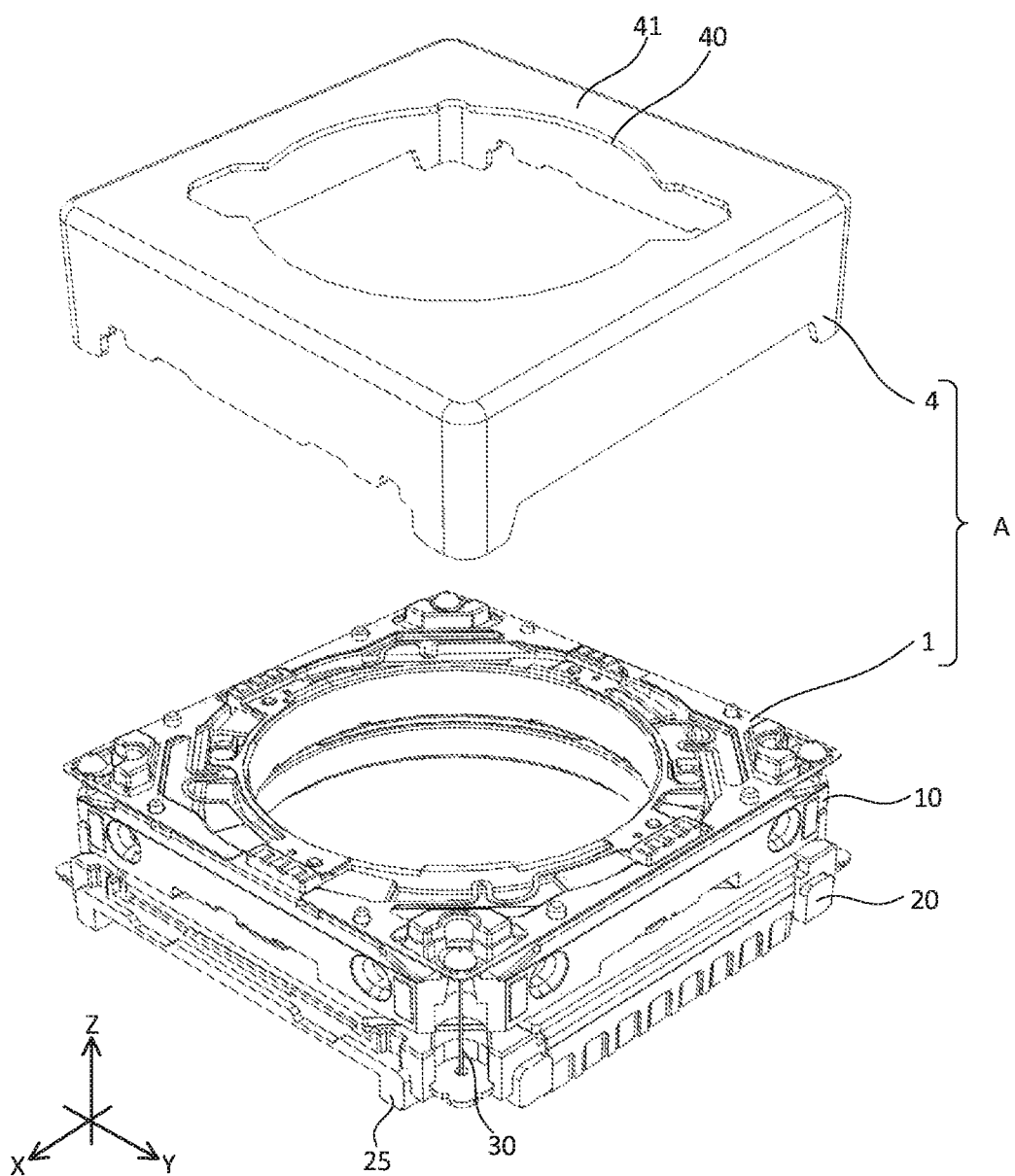
FIG. 3 is an exploded perspective view of the camera module.
Figure 4:
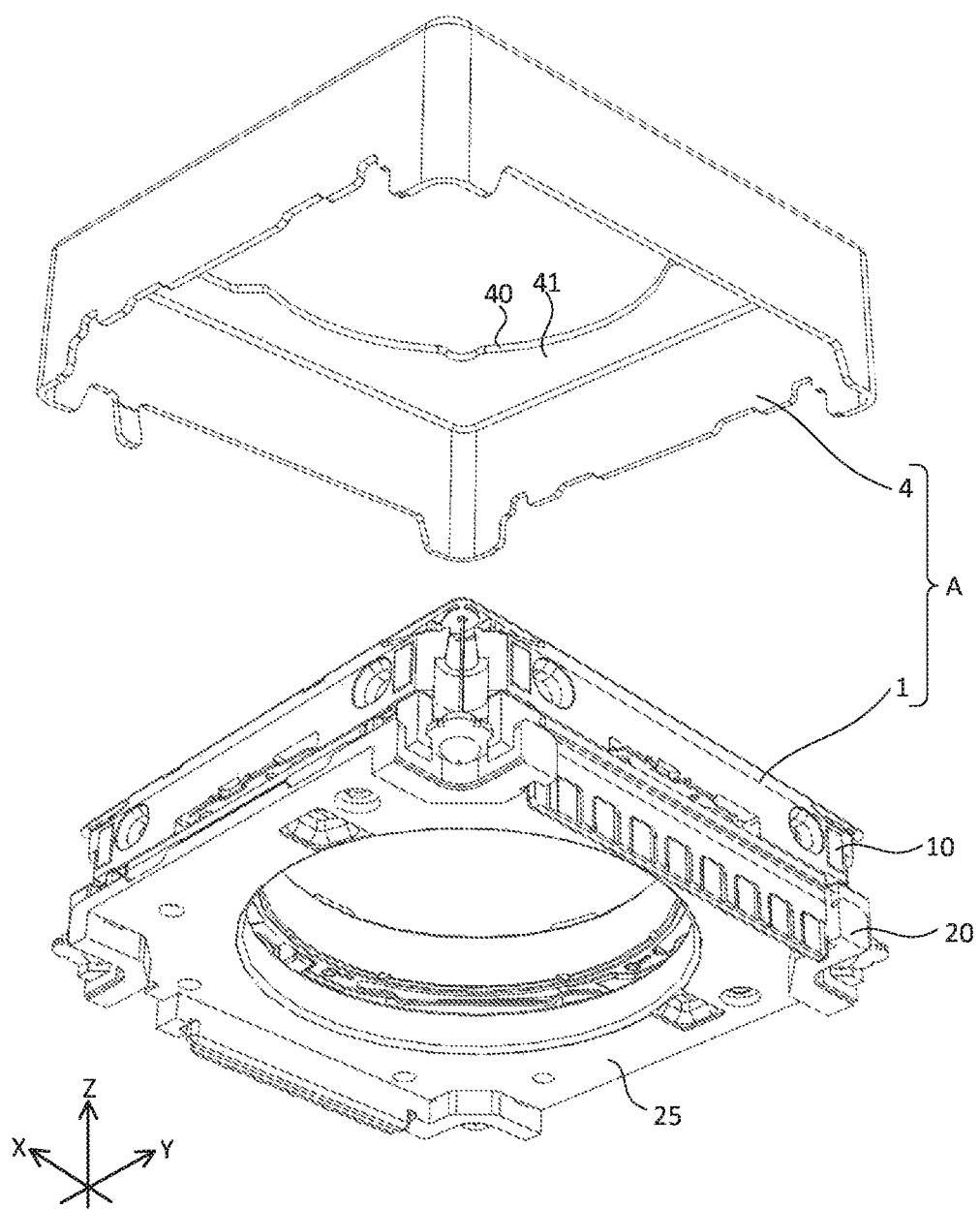
FIG. 4 is an exploded perspective view of the camera module.

FIGS. 1A and 1B illustrate smartphone M including camera module A according to an embodiment of the present invention. FIG. 1A is a front view of smartphone M, and FIG. 1B is a rear view of smartphone M. FIG. 2 is a perspective view of an external appearance of camera module A. FIGS. 3 and 4 are exploded perspective views of camera module A. FIG. 3 is an upper perspective view, and FIG. 4 is a lower perspective view.

As illustrated in FIGS. 2 to 4, the present embodiment will be described with an orthogonal coordinate system (X, Y, Z). Also in the drawings described later, descriptions will be made with an orthogonal coordinate system (X, Y, Z). In addition, the intermediate directions between the X and the Y directions, or in other words, the diagonal directions in plan view in the Z direction of camera module A are the U direction and the V direction (see FIG. 17).

Camera module A is mounted such that the vertical direction (or the horizontal direction) is the X direction, the horizontal direction (or the vertical direction) is the Y direction, and the front-rear direction is the Z direction at the time of actually capturing an image with smartphone M. That is, the Z direction is the optical axis direction, the + side (e.g., the upper side in FIG. 2) in the Z direction is the light reception side in the optical axis direction (also referred to as the macro position side), and the − side (e.g., the lower side in FIG. 2) in the Z direction is the imaging side in the optical axis direction (also referred to as infinity position side). In addition, the X direction and the Y direction orthogonal to the Z axis may be referred to as "direction orthogonal to the optical axis," and the XY plane may be referred to as "plane orthogonal to the optical axis."

In addition, in the following description of the members of camera module A, "radial direction" and "circumferential direction" are directions in OIS movable part 10 described later (specifically, lens holder 110 and magnet holder 12a; see FIG. 7) unless otherwise noted.

In addition, for convenience of the following descriptions, in plan view of camera module A illustrated in FIG. 2 and the components of camera module A in the Z direction, the corner part on the + side in the X direction and on the + side in the Y direction is referred to as a first corner part, the corner part on the − side in the X direction and on the + side in the Y direction as a second corner part, the corner part on the − side in the X direction and on the − side in the Y direction as a third corner part, and the corner part on the + side in the X direction and on the − side in the Y direction as a fourth corner part.

For example, smartphone M illustrated in FIGS. 1A and 1B is provided with camera module A as a back side camera OC. In camera module A, lens driving device 1 is employed. Lens driving device 1 has an auto-focusing function of automatically performing focusing for capturing a subject (hereinafter referred to as "AF (Auto Focus) function"), and a shake-correcting function (or "shake-correcting part," hereinafter referred to as "OIS (Optical Image Stabilization) function") of optically correcting handshake (vibration) upon capturing an image to reduce the irregularities of the image.

Auto-focusing and shake-correcting lens driving device 1 includes an auto-focusing driving part (hereinafter referred to as "AF driving part") for moving the lens part in the optical axis direction, and a shake-correcting driving part (hereinafter referred to as "OIS driving part") for swaying the lens part in the plane orthogonal to the optical axis.

Camera Module

Camera module A includes a lens part (not illustrated) in which a lens is housed in a lens barrel (not illustrated) having a cylindrical shape, auto-focusing and shake-correcting lens driving device 1, an image capturing part (not illustrated) that captures a subject image imaged with the lens part, cover 4, and the like.

Cover

As viewed in plan view in the Z direction (optical axis direction) cover 4 is a capped square cylindrical body having a square shape, and includes circular opening 40 in the top surface (surface on the + side in the Z direction). A lens part (not illustrated) is exposed to the outside through opening 40. Cover 4 covers (i.e., houses inside the internal space) OIS movable part 10 described later. Cover 4 is preferably composed of a conductive material for preventing generation of noise, and is grounded (so-called shield cover). Cover 4 is fixed to lens driving device 1 (base member 25) with an adhesive agent (not illustrated) for example.

Image Pickup Part

The image pickup part (not illustrated) is disposed on the − side in the Z direction (the imaging side in the optical axis direction) of lens driving device 1. The image pickup part includes an imaging device (not illustrated) such as a charge-coupled device (CCD) image sensor and a complementary metal oxide semiconductor (CMOS) image sensor and a sensor substrate on which to mount the imaging device. The imaging device picks up a subject image imaged by a lens part (not illustrated), for example. Lens driving device 1 is mounted on the sensor substrate (not illustrated), and electrically connected with the sensor substrate.

Lens Driving Device

Figure 5:
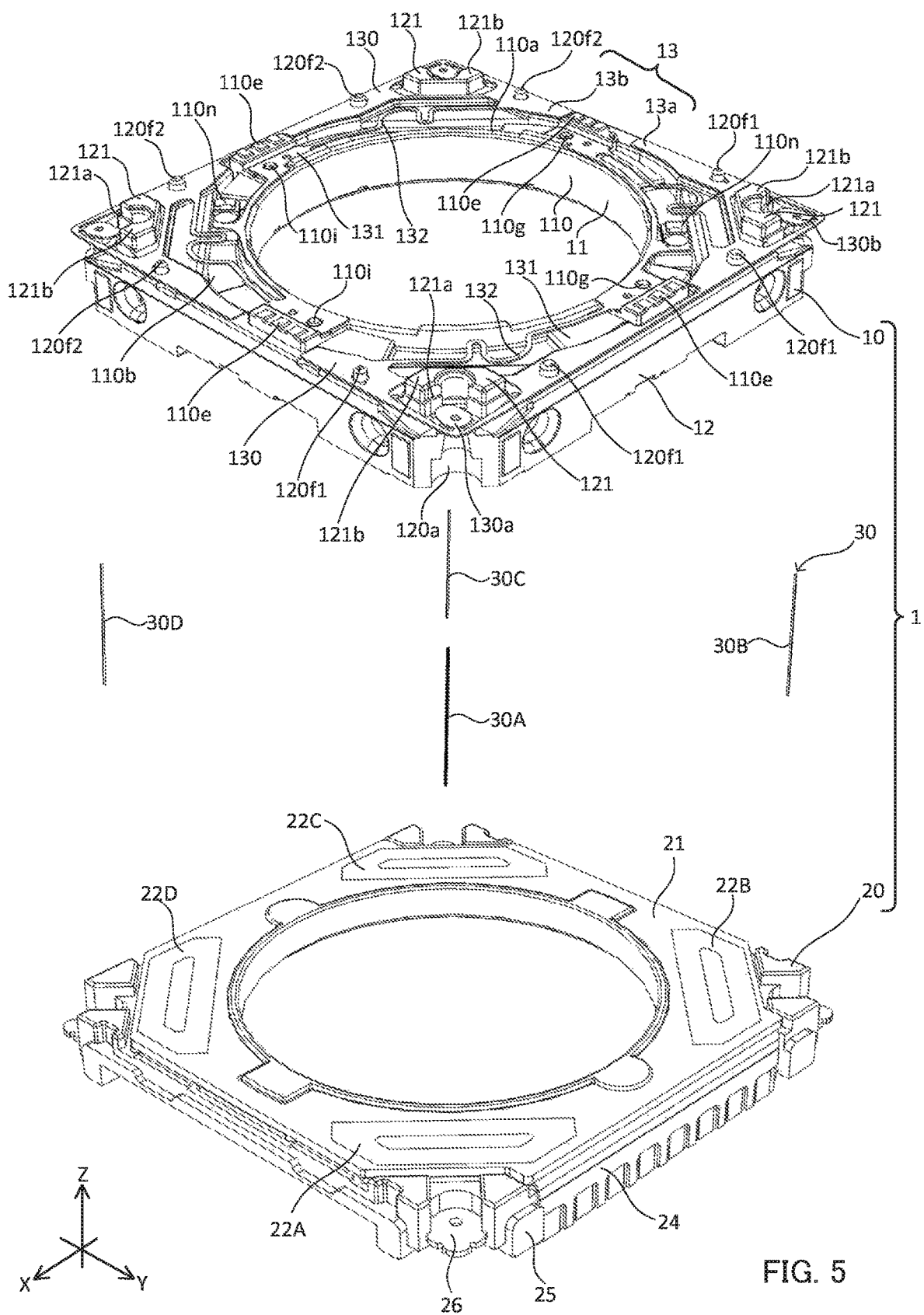
FIG. 5 is an exploded perspective view of a lens driving device.
Figure 6:
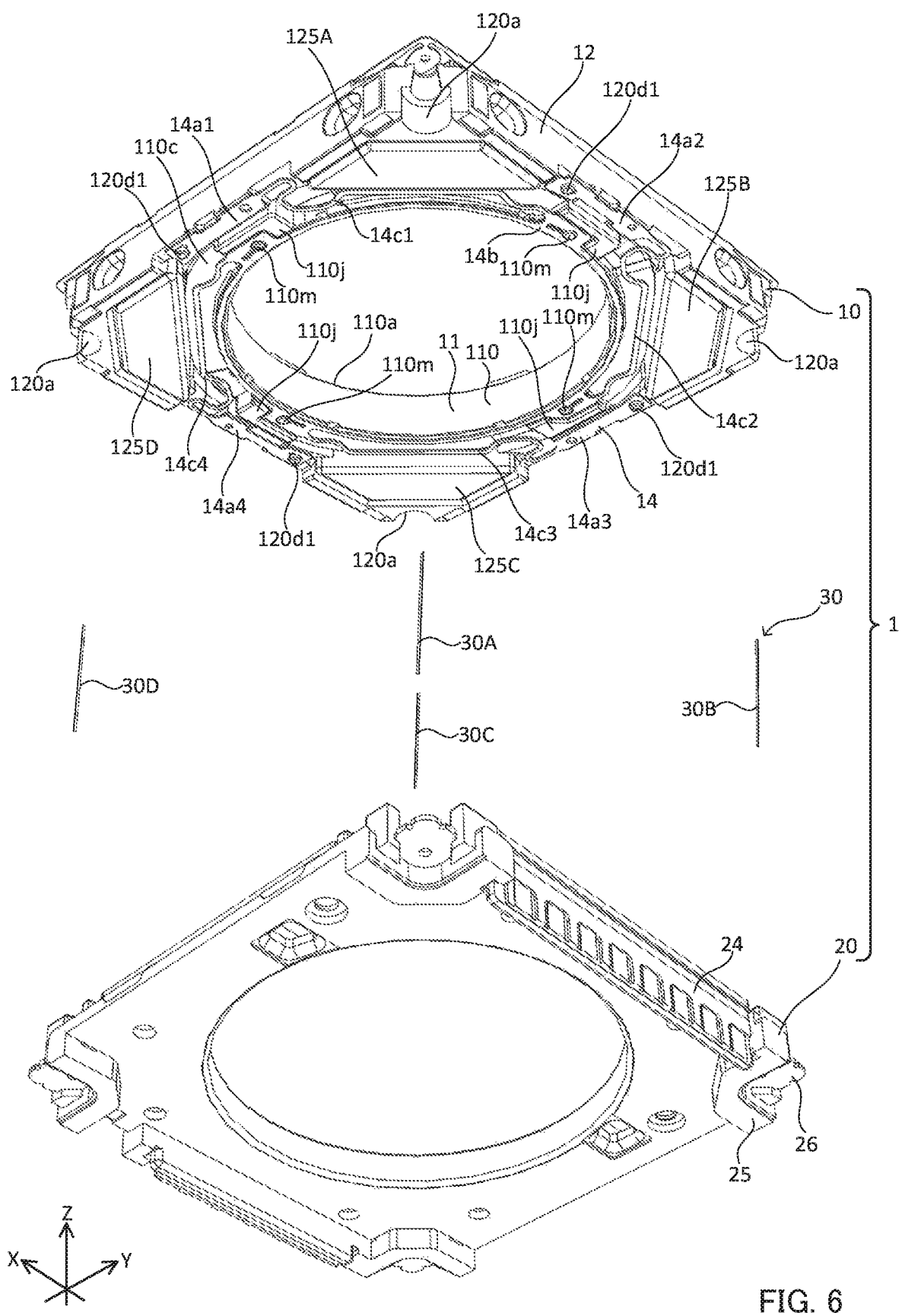
FIG. 6 is an exploded perspective view of the lens driving device as viewed from an angle different from FIG. 5.
Figure 7:
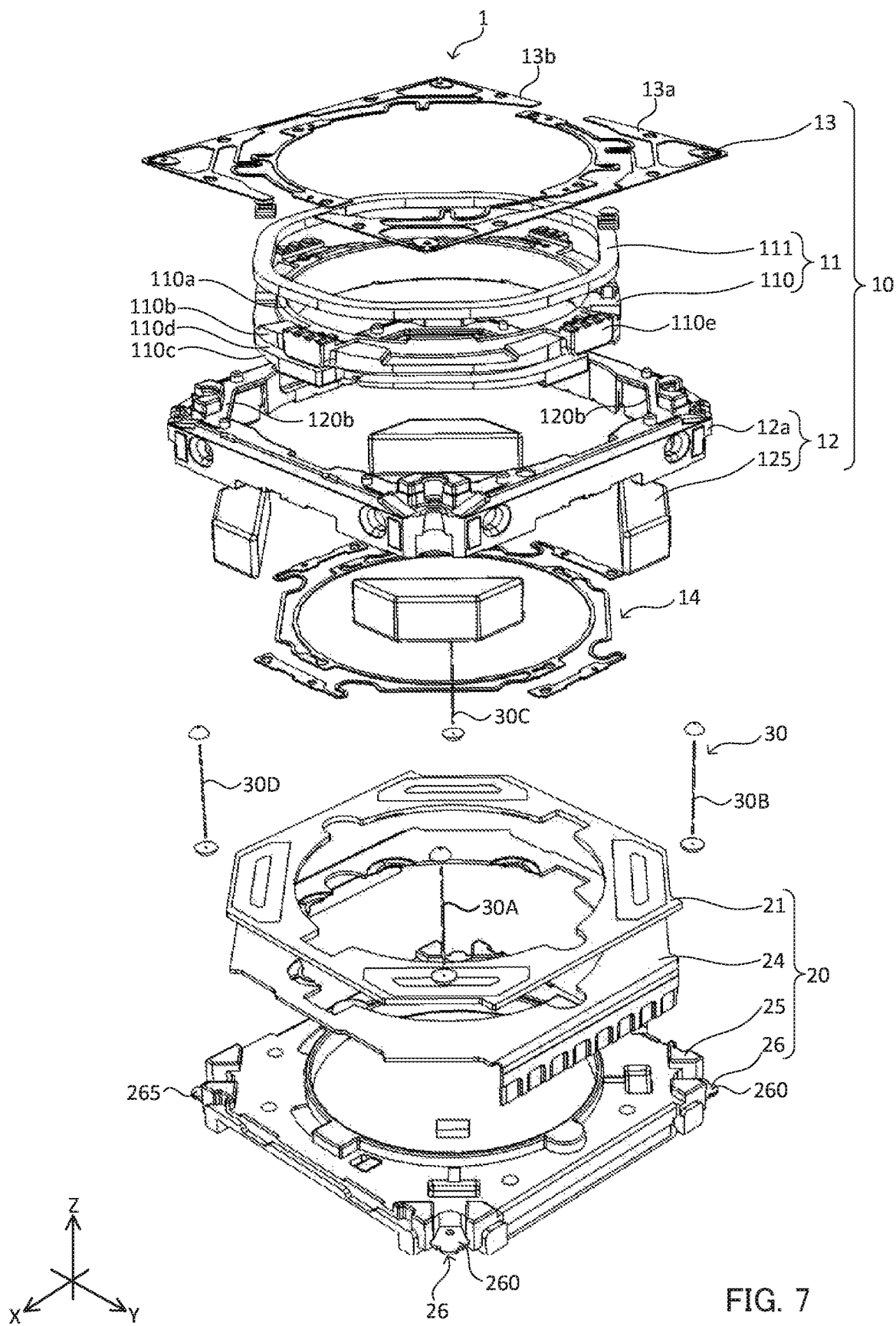
FIG. 7 is an exploded perspective view of the lens driving device.
Figure 8:
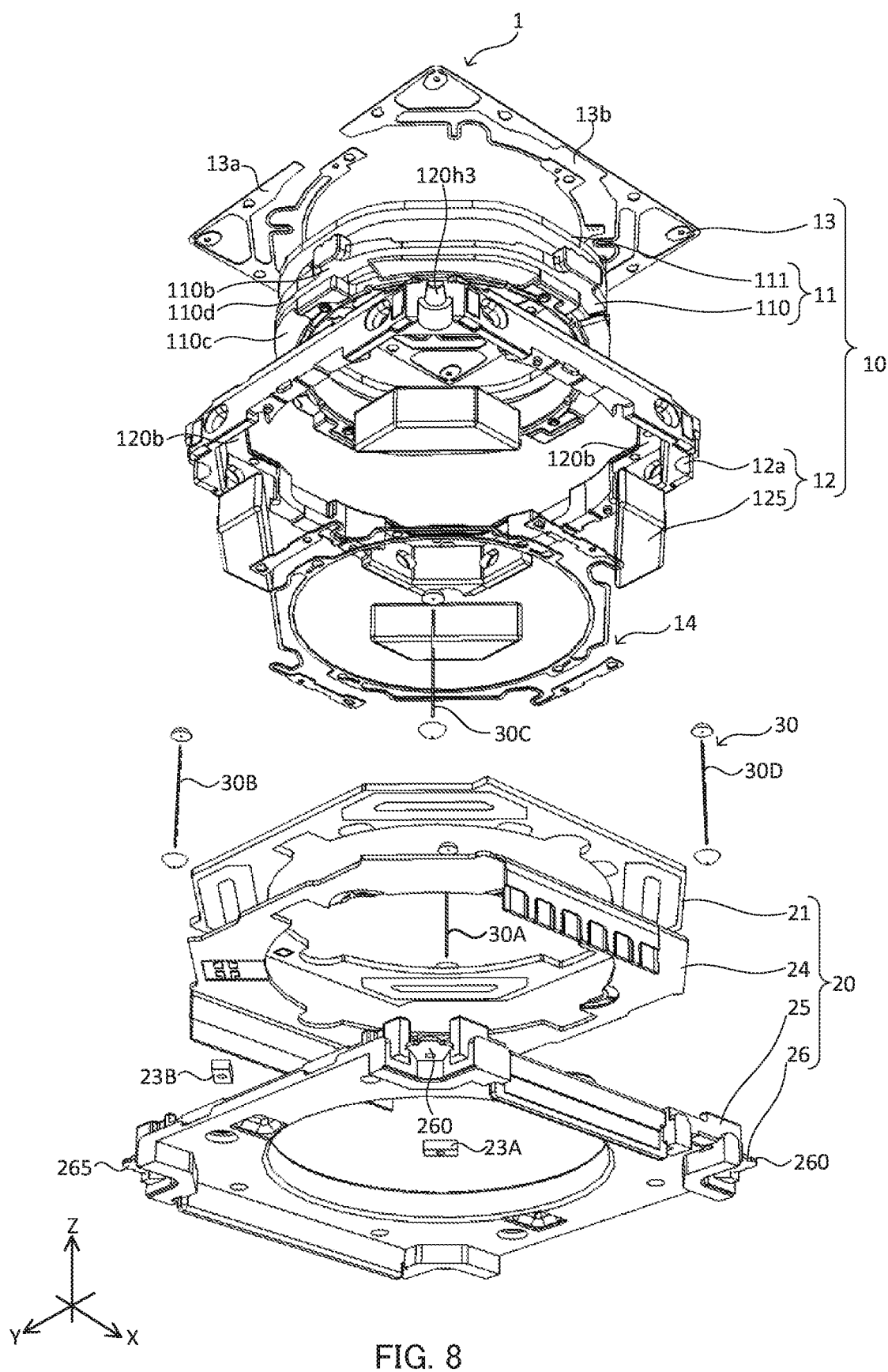
FIG. 8 is an exploded perspective view of the lens driving device as viewed from an angle different from FIG. 7.

FIGS. 5 to 8 are exploded perspective views of lens driving device 1. FIGS. 5 and 7 are top perspective views, and FIGS. 6 and 8 are lower perspective views. Note that FIG. 8 is an exploded perspective view of lens driving device 1 as viewed from a position shifted from FIG. 6 by 180 degrees about the Z direction. As illustrated in FIGS. 5 and 6, lens driving device 1 includes OIS movable part 10 (also referred to as movable part), OIS fixing part 20 (also referred to as fixing part), suspension wire 30 (suspension wires 30A to 30D) and the like.

OIS Movable Part

OIS movable part 10 includes an OIS magnet part serving as a component of the OIS voice coil motor, and sways in a plane orthogonal to the optical axis at the time of shake correction. OIS fixing part 20 includes an OIS coil part. That is, the OIS driving part of lens driving device 1 is of a moving magnet type. OIS movable part 10 is also an "AF unit" including the AF driving part.

OIS movable part 10 is disposed on the + side in the Z direction relative to OIS fixing part 20 and is separated from OIS fixing part 20. OIS movable part 10 is coupled with OIS fixing part 20 through OIS supporting part 30.

Specifically, OIS supporting part 30 is composed of four suspension wires extending along the Z direction (hereinafter referred to as suspension wires 30). One ends (lower ends) of suspension wires 30 are fixed to OIS fixing part 20 (or more specifically, first wire connecting part 260 and second wire connecting part 265 of lead 26; see FIGS. 7 and 8), and the other ends (upper ends) thereof are fixed to OIS movable part 10 (or more specifically, upper elastic supporting part 13; see FIG. 9A). OIS movable part 10 is supported by suspension wire 30 such that OIS movable part 10 can sway in the plane orthogonal to the optical axis.

In the present embodiment, suspension wire 30A, of four suspension wires 30, disposed at the first corner part and suspension wire 30B, of four suspension wires 30, disposed at the second corner part are used as power feeding paths to an AF control part (not illustrated).

On the other hand, suspension wire 30C disposed at the third corner part and suspension wire 30D disposed at the fourth corner part are used as signal paths for transmitting a control signal to the AF control part (not illustrated). Note that the number of suspension wires 30 is not limited to this, and may be greater than four, for example.

Now OIS movable part 10 is described with reference to FIGS. 5 to 17. As illustrated in FIGS. 5 and 6, OIS movable part 10 (also referred to as AF unit) includes AF movable part 11, AF fixing part 12, upper elastic supporting part 13 (FIG. 9A), lower elastic supporting part 14 (FIG. 9B) and the like.

AF Movable Part

AF movable part 11 is separated from AF fixing part 12 inside AF fixing part 12 in the radial direction. AF movable part 11 is coupled with AF fixing part 12 by upper elastic supporting part 13 and lower elastic supporting part 14.

AF movable part 11 includes a coil part of an AF voice coil motor, and moves with respect to AF fixing part 12 in the Z direction (optical axis direction) at the time of focusing. AF fixing part 12 includes a magnet part of the AF voice coil motor. That is, the AF driving part of lens driving device 1 is of a moving coil type.

AF movable part 11 includes lens holder 110 and AF coil part 111 (see FIGS. 7 and 8).

Lens Holder

Lens holder 110 includes cylindrical lens housing part 110a. Preferably, the inner periphery surface of lens housing part 110a is provided with a groove (not illustrated) to which adhesive agent is applied. A method of screwing a lens part (not illustrated) to lens housing part 110a might damage suspension wire 30 that supports OIS movable part 10.

In contrast, in the present embodiment, damaging of suspension wire 30 at the time when the lens part is attached can be prevented since a lens part (not illustrated) is fixed to the inner periphery surface of lens housing part 110a by bonding. In addition, the inner periphery surface of lens housing part 110a is provided with a groove, and the groove holds an appropriate amount of adhesive agent, thereby achieving a high bonding power between lens holder 110 and the lens part.

Lens holder 110 includes upper flange 110b (see FIGS. 5 to 7) and lower flange 110c (see FIGS. 6 and 7) protruding from the outer peripheral surface of lens housing part 110a to the outside in the radial direction. Lens holder 110 includes, in the outer peripheral surface, coil winding part 110d having a groove form that is continuous over the entire circumference between upper flange 110b and lower flange 110c (see FIG. 7).

That is, lens holder 110 has a bobbin structure. Each of upper flange 110b and lower flange 110c has a substantially octagonal shape in plan view.

Lens holder 110 includes upper protruding part 110e protruding to the outside in the radial direction and to the + side in the Z direction at parts (four places separated from each other in the circumferential direction) of upper flange 110b (see FIGS. 5 to 7). The top surface (surface on the + side in the Z direction) of upper protruding part 110e serves as a locking part that limits the movement of AF movable part 11 to the + side in the Z direction (the light reception side in the optical axis direction).

Figure 9A:
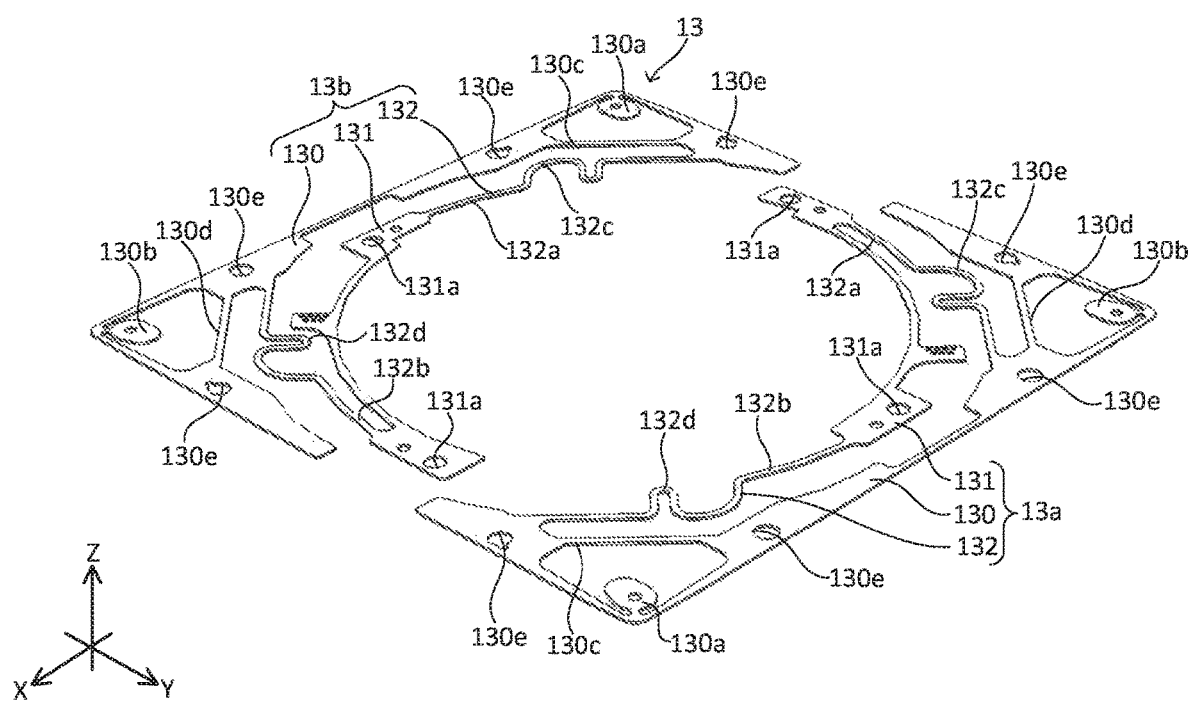
FIG. 9A is a perspective view of an upper elastic supporting part.
Figure 10A:
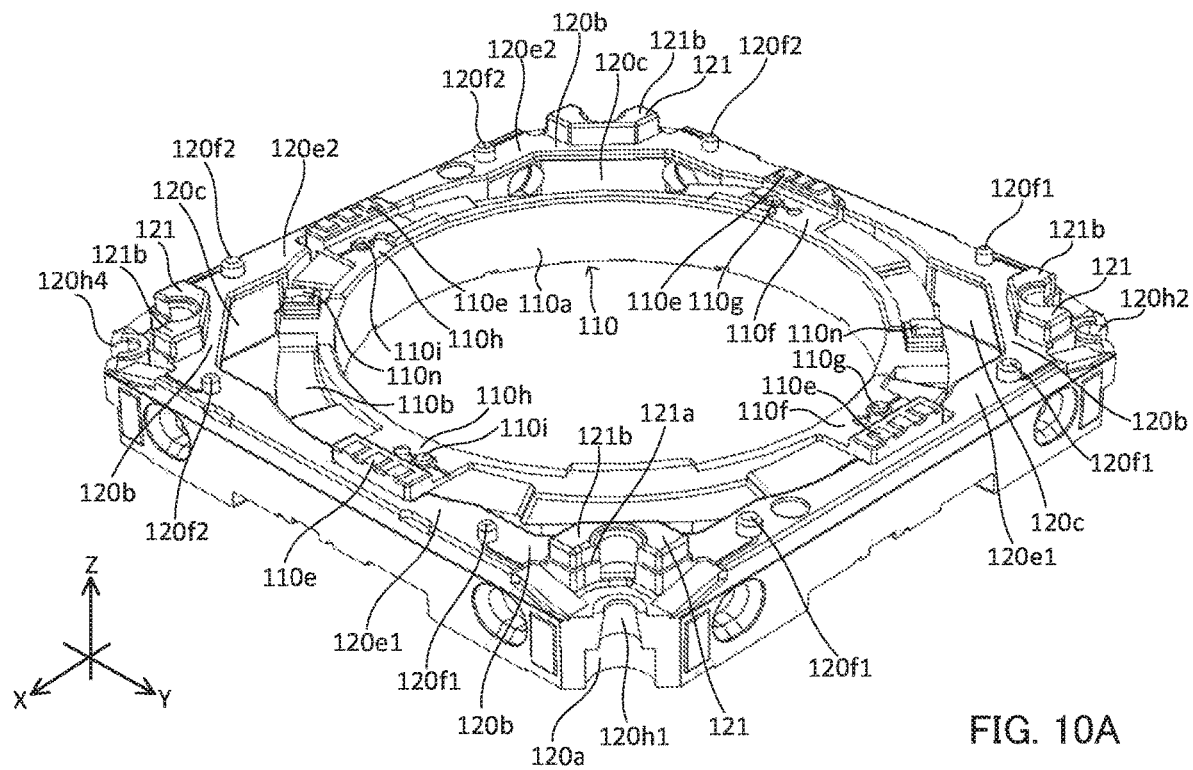
FIGS. 10A and 10B are perspective views illustrating a configuration of a lens holder and a magnet holder.

Lens holder 110 includes a pair of upper spring fixing parts 110f at an end portion of the − side in the X direction and an end portion of the + side in the Y direction in the surface (top surface) on the + side in the Z direction (see FIG. 10A). Each upper spring fixing part 110f includes upper boss 110g (see FIGS. 5 and 10A) for positioning and fixing inner fixing part 131 of upper spring element 13a described later (see FIGS. 5 and 9A).

On the other hand, lens holder 110 includes a pair of upper spring fixing parts 110h (see FIG. 10A) at an end portion of the + side in the X direction and an end portion of the − side in the Y direction in the top surface. Each upper spring fixing part 110h includes upper boss 110i (see FIGS. 5 and 10A) for positioning and fixing inner fixing part 131 of upper spring element 13b described later (see FIGS. 5 and 9A).

Lens holder 110 includes, in the top surface thereof, a pair of tying parts 110n at a portion (the end portion of the + side in the V direction) between the pair of upper spring fixing parts 110*f* in the circumferential direction, and at a portion (the end portion of the − side in the V direction) between the pair of upper spring fixing parts 110*h* in the circumferential direction (see FIGS. 5 and 10A). In the assembled state, the pair of tying parts 110*n* are disposed in a gap between the top surface of lens holder 110 and the inner surface of top plate part 41 of cover 4 in the Z direction (see FIGS. 2 to 4). With the configuration in which the pair of tying parts 110*n* are disposed in the gap, space-saving of lens holder 110 in the radial direction can be achieved.

Lens holder 110 includes lower protruding part 110*j* (see FIGS. 6 and 10B) protruding to the outside in the radial direction and to the − side in the Z direction at parts (four places separated from each other in the circumferential direction) of lower flange 110*c*. The tip end surface (lower end surface) of lower protruding part 110*j* that is the end surface of lower protruding part 110*j* on the − side in the Z direction is opposite to the top surface (the surface on the + side in the Z direction) of coil substrate 21 of OIS fixing part 20 in the Z direction. The surface (lower surface) of lower protruding part 110*j* on the − side in the Z direction serves as a locking part for limiting the movement of AF movable part 11 to the − side in the Z direction.

Figure 10B:
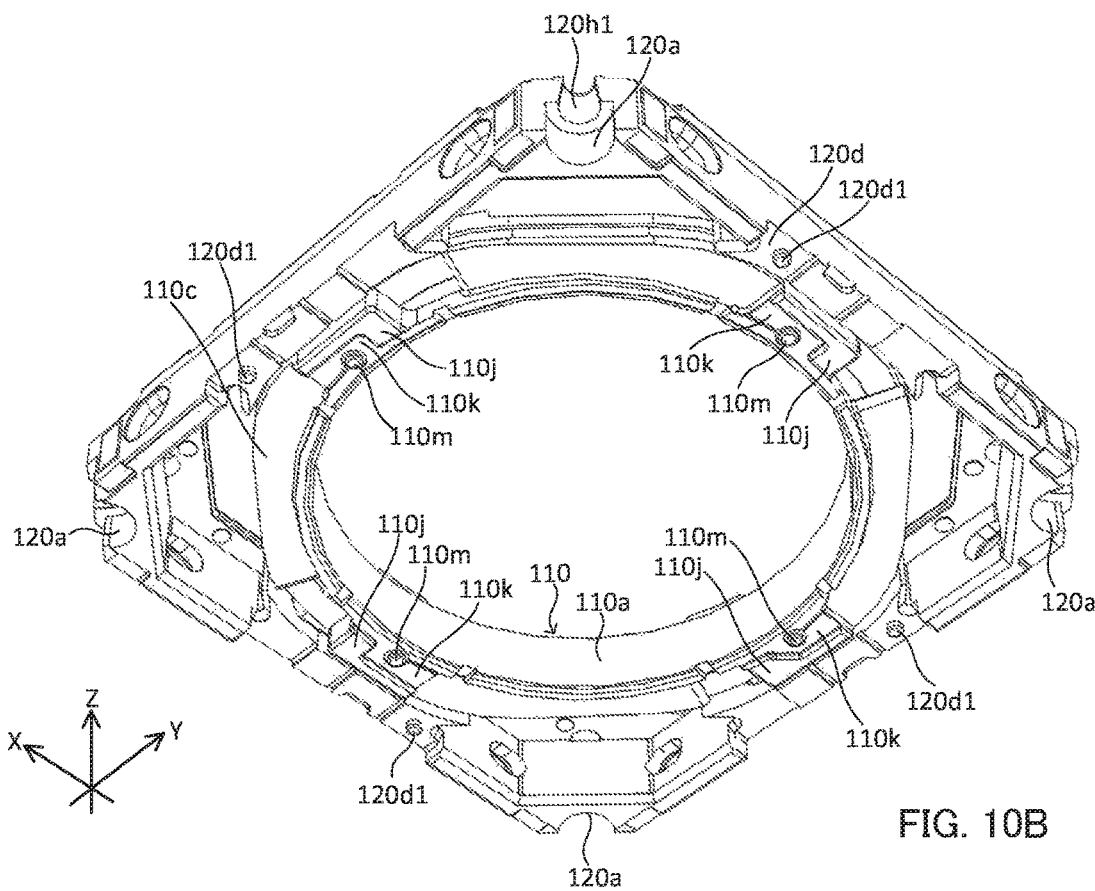

Lens holder 110 includes lower spring fixing parts 110*k* at positions (in the present embodiment, four positions) in the lower surface (see FIG. 10B). Each lower spring fixing part 110*k* includes lower boss 110*m* for positioning and fixing inner fixing part 14*b* of lower elastic supporting part 14 (see FIGS. 6 and 10B).

In the present embodiment, lens holder 110 is formed with polyarylate (PAR) or a PAR alloy composed of different types of resins including PAR (e.g., PAR/PC). With this configuration, a welding power higher than that of a conventional shaping material such as liquid crystal polymer (LCP) is achieved, and accordingly toughness and impact resistance can be ensured even when lens holder 110 is thinned Accordingly, a small external size of lens driving device 1 can be achieved, and downsizing and weight reduction can be achieved.

AF Coil Part

AF coil part 111 (see FIGS. 7 and 8) is an air-core coil that is energized at the time of focusing, and is wound around the outer peripheral surface of coil winding part 110*d* of lens holder 110. One end of AF coil part 111 is tied to one tying part 110*n* of lens holder 110 and the other end of AF coil part 111 is tied to the other tying part 110*n*.

AF Fixing Part

AF fixing part 12 includes magnet holder 12*a* and magnet part 125 (see FIG. 7).

Magnet Holder

Magnet holder 12*a* has a square cylindrical shape which is square as viewed in plan view in the Z direction. Magnet holder 12*a* includes arc grooves 120*a* recessed inward in the radial direction at four corners of the outer peripheral surface (see FIG. 6). Suspension wires 30A to 30D are disposed at arc grooves 120*a*.

Magnet holder 12*a* includes four magnet cover parts 120*b* protruding inward in the radial direction at the end portion (upper end) on the + side in the Z direction of the four corners (see FIG. 10A). Magnet holder 12*a* includes magnet installation parts 120*c* at the four corners in the inner peripheral surface (see FIG. 10A).

Magnet holder 12*a* includes lower spring fixing part 120*d* for fixing lower elastic supporting part 14 at the end surface (lower surface) on the − side in the Z direction (see FIG. 10B). Lower spring fixing part 120*d* includes a plurality of (in the present embodiment, four) lower bosses 120*d*1 (see FIGS. 6 and 10B) for positioning and fixing outer fixing parts 14*a*1 to 14*a*4 of lower elastic supporting part 14.

Magnet holder 12*a* includes upper spring fixing part 120*e*1 (see FIG. 10A) for fixing upper spring element 13*a* of upper elastic supporting part 13 in a half part (i.e., the half part on the + side in the Y direction) including the first corner part and the second corner part in the surface on the + side in the Z direction (top surface). Upper spring fixing part 120*e*1 includes four upper bosses 120*f*1 for positioning and fixing upper spring element 13*a* of upper elastic supporting part 13 (see FIGS. 5 and 10A).

On the other hand, magnet holder 12*a* includes upper spring fixing part 120*e*2 for fixing upper spring element 13*b* of upper elastic supporting part 13 in a half part (i.e., the half part on the − side in the Y direction) including the third corner part and the fourth corner part in the top surface (see FIG. 10A). Upper spring fixing part 120*e*2 includes four upper bosses 120*f*2 for positioning and fixing upper spring element 13*b* of upper elastic supporting part 13 (see FIGS. 5 and 10A).

Upper spring fixing part 120*e*1 includes wire insertion parts 120*h*1 and 120*h*2 for insertion of suspension wires 30A and 30B at the corner parts (i.e., the first corner part and the second corner part) (see FIG. 10A).

On the other hand, upper spring fixing part 120*e*2 includes wire insertion parts 120*h*3 and 120*h*4 for insertion of suspension wires 30C and 30D at the corner parts (i.e., the third corner part and the fourth corner part) (see FIGS. 8 and 10A).

With wire insertion parts 120*h*1 to 120*h*4, interference between suspension wire 30 and magnet holder 12*a* at the time when OIS movable part 10 sways can be avoided.

On the surface on + side in the Z direction (also referred to as the top surface or the surface on the light reception side in the optical axis direction) at each magnet cover part 120*b*, magnet holder 12*a* includes stopper protrusion 121 protruding from the top surface to the + side in the Z direction (see FIGS. 5 and 10A). In other words, magnet holder 12*a* includes stopper protrusions 121 in the proximity of regions inside wire insertion parts 120*h*1 to 120*h*4 in the radial direction.

Damper

Figure 11:
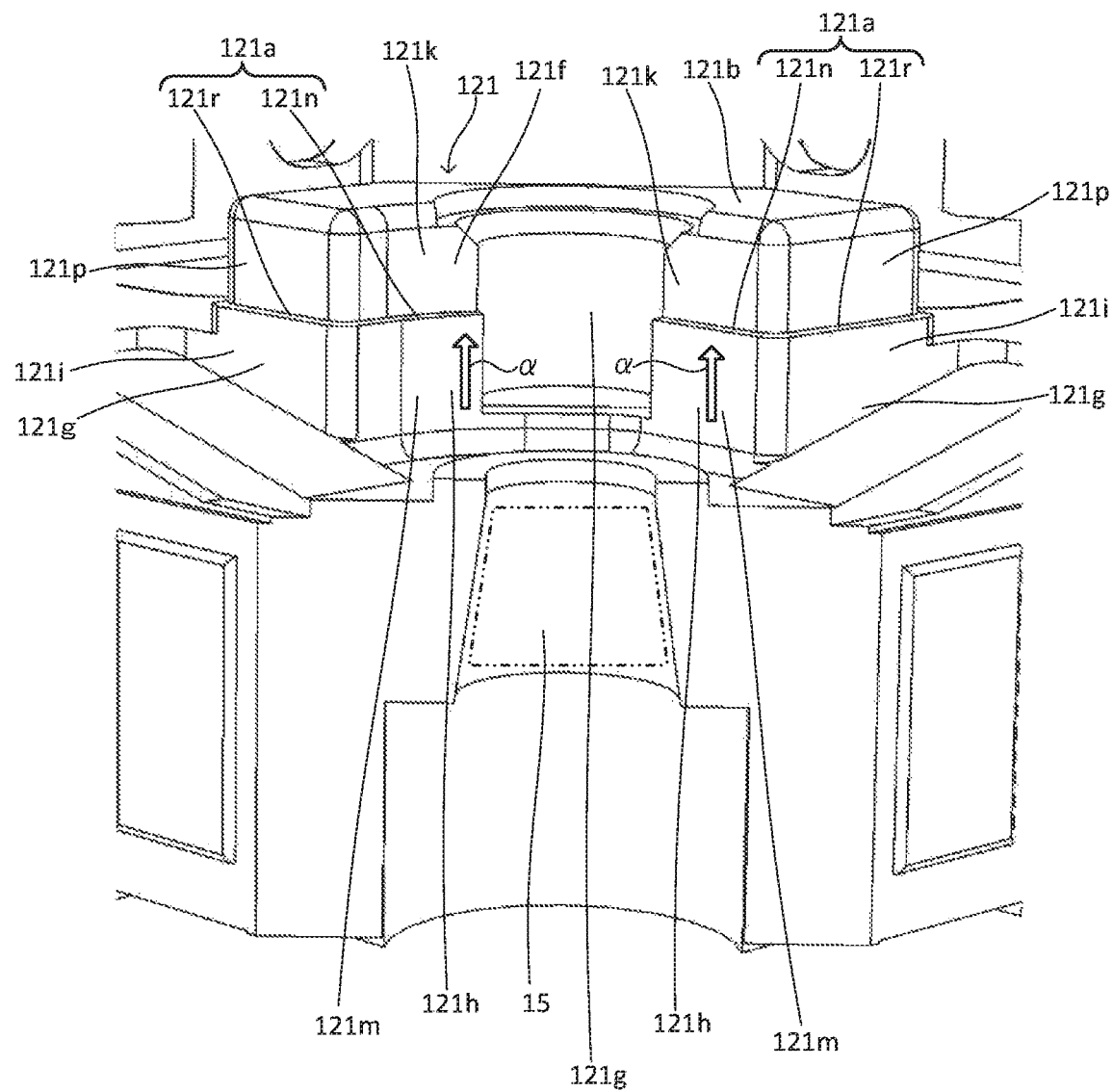
FIG. 11 illustrates a first corner part of the magnet holder as viewed from outside in a radial direction.

In addition, dampers 15 are disposed so as to surround suspension wires 30A to 30D at wire insertion parts 120*h*1 to 120*h*4 of magnet holder 12*a* (see FIG. 11). In this state, dampers 15 are in contact (or more specifically, covered) with suspension wires 30A to 30D. With the above-mentioned dampers 15 interposed between suspension wires 30A to 30D and magnet holder 12*a*, the generation of unnecessary resonance (high-order resonance mode) is suppressed, and the operation can be reliably stabilized.

Damper 15 can be readily applied to wire insertion parts 120*h*1 to 120*h*4 with a dispenser. Examples of damper 15 include viscous fluid such as ultraviolet curing silicone gel.

Stopper Protrusion

Tip end surface 121*b* of stopper protrusion 121 (i.e., the surface on the + side in the Z direction) is located over other portions of OIS movable part 10 on the + side in the Z direction. In the assembled state, tip end surface 121*b* is opposite to a surface (lower surface) of top plate part 41 of cover 4 on the − side in the Z direction with a predetermined gap therebetween in the Z direction.

Accordingly, when an impact is exerted on OIS movable part 10, and OIS movable part 10 is displaced to the + side in the Z direction, top plate part 41 of cover 4 makes contact with tip end surface 121*b* before other portions make contact with tip end surface 121*b*. In this manner, stopper protrusion 121 limits displacement of OIS movable part 10 to the + side in the Z direction to a predetermined amount.

Stopper protrusion 121 includes flow stopper part 121a (e.g., stopper step 121n and side stopper step 121r described later; see FIGS. 5, 11, and 12) at a side surface thereof. In the side surface of stopper protrusion 121, flow stopper part 121a is provided in at least a part of a surface that serves as a path of damper 15 moving to the + side in the Z direction.

Flow stopper part 121a serves as a resistance against displacement of damper 15 to the + side in the Z direction along the side surface of stopper protrusion 121. That is, flow stopper part 121a acts to prevent damper 15 from moving to the + side in the Z direction and from making contact with tip end surface 121b of stopper protrusion 121.

The reason for the prevention of the contact is that, when damper 15 makes contact with tip end surface 121b of stopper protrusion 121 and the lower surface of top plate part 41 of cover 4, damper 15 might become a resistance against displacement of OIS movable part 10 in shake correction, and might reduce the accuracy of shake correction.

Figure 12:
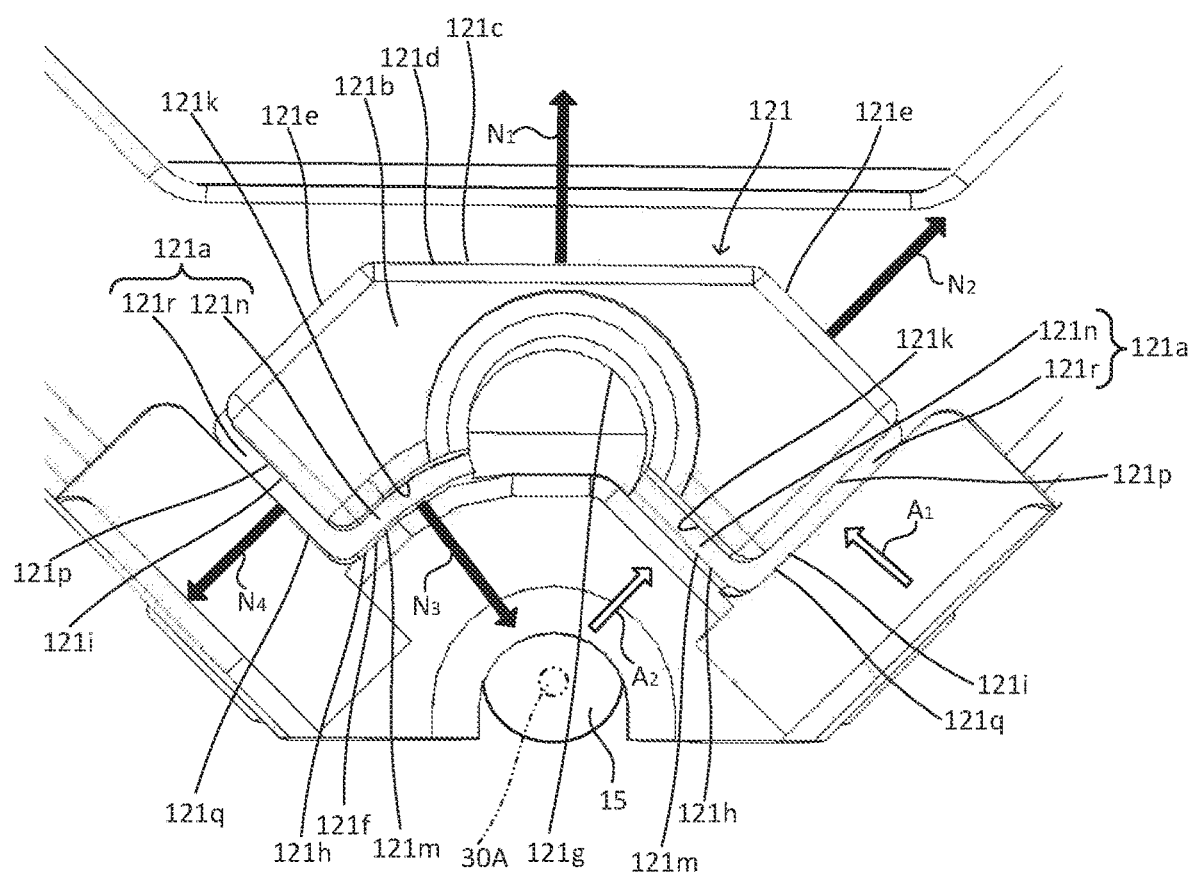
FIG. 12 illustrates the first corner part of the magnet holder as viewed from a light reception side in an optical axis direction.

With reference to FIGS. 11 and 12, the structure of stopper protrusion 121 is elaborated. FIG. 11 illustrates the first corner part of magnet holder 12a as viewed from the outside in the radial direction. FIG. 12 illustrates the first corner part of magnet holder 12a as viewed from the + side in the Z direction (the light reception side in the optical axis direction).

Below, a structure of stopper protrusion 121 provided at the first corner part is described as an example. Note that the structure of each of stopper protrusions 121 provided at second corner part to the fourth corner part is similar to the structure of stopper protrusion 121 provided at the first corner part.

The structure of stopper protrusions 121 provided at the second to fourth corner parts may be appropriately understood from the following description of stopper protrusion 121 provided at the first corner part.

Stopper protrusion 121 provided at the first corner part includes tip end surface 121b, inner surface 121c, and outer surface 121f. Tip end surface 121b faces the + side in the Z direction.

Inner surface 121c is composed of a surface facing inside in the radial direction. Note that the surface facing inside in the radial direction is a surface whose normal vector (e.g., $N_1$ and $N_2$ in FIG. 12) has a vector component toward inside in the radial direction (upper side in FIG. 12). Specifically, inner surface 121c includes center inner surface 121d and a pair of side inner surfaces 121e. Note that inner surface 121c is provided with no step such as stopper step 121n and side stopper step 121r described later.

Outer surface 121f (also referred to as first side surface) is composed of a surface facing the outside in the radial direction. Note that the surface facing the outside in the radial direction is a surface whose normal vector (e.g., N3 and N4 in FIG. 12) has a vector component toward the outside in the radial direction (the lower side in FIG. 12).

Specifically, in plan view from suspension wire 30A side, outer surface 121f includes outer recessed surface 121g at a center portion in the width direction (in FIGS. 11 and 12, the horizontal direction). Outer surface 121f includes a pair of wire-opposing surfaces 121h on both sides of outer recessed surface 121g in the width direction. In addition, outer surface 121f includes a pair of side outer surfaces 121i outside the pair of wire-opposing surfaces 121h in the width direction.

Each wire-opposing surface 121h is opposed to suspension wire 30A in the radial direction of suspension wire 30A.

Each wire-opposing surface 121h includes first opposing surface 121k on the + side in the Z direction and second opposing surface 121m on the − side in the Z direction.

Second opposing surface 121m is located outside relative to first opposing surface 121k in the radial direction. In other words, in the radial direction, second opposing surface 121m is closer to suspension wire 30A relative to first opposing surface 121k.

Each wire-opposing surface 121h includes stopper step 121n that connects between the end portion of first opposing surface 121k on the − side in the Z direction and the end portion of second opposing surface 121m on the + side in the Z direction. Stopper step 121n serves as flow stopper part 121a. Note that stopper step 121n may be disposed in multiple positions separated in the Z direction in the pair of wire-opposing surfaces 121h.

Each outer surface 121i includes first side surface 121p on the + side in the Z direction and second side surface 121q on the − side in the Z direction.

Second side surface 121q is located outside first side surface 121p in the radial direction. Each side outer surface 121i includes side stopper step 121r that connects between the end portion of first side surface 121p on the − side in the Z direction and the end portion of second side surface 121q on the + side in the Z direction.

Together with stopper step 121n, side stopper step 121r serves as flow stopper part 121a. Note that side stopper step 121r may be provided in plural positions separated from each other in the Z direction in the pair of side outer surfaces 121i. Side stopper step 121r of the pair of side outer surfaces 121i may be omitted.

Next, with reference to FIGS. 13A to 16B, a modification of flow stopper part 121a is described.

FIGS. 13A and 13B are drawings for describing flow stopper part 121a of Modification 1. FIG. 13A is a schematic view as viewed in arrow $A_1$ direction in stopper protrusion of FIG. 12, and FIG. 13B is a schematic view of a part of the stopper protrusion as viewed in arrow $A_2$ direction in FIG. 12.

In stopper protrusion 121A illustrated in FIGS. 13A and 13B, wire opposing surface 121h1 includes first opposing surface 121k1 on the + side in the Z direction (the upper side in FIGS. 13A and 13B) and second opposing surface 121m1 on the − side in the Z direction (the lower side in FIGS. 13A and 13B). Second opposing surface 121m1 is located inside first opposing surface 121k1 in the radial direction (the right side in FIG. 13A).

Each wire-opposing surface 121h1 includes stopper step 121n1 that connects between the end portion of first opposing surface 121k1 on the − side in the Z direction and the end portion of second opposing surface 121m1 on the + side in the Z direction.

Side outer surface 121i1 includes first side surface 121p1 on the + side in the Z direction and second side surface 121q1 on the − side in the Z direction. Second side surface 121q1 is located inside first side surface 121p1 in the radial direction (the left side in FIG. 13B).

Each side outer surface 121i1 includes side stopper step 121r1 that connects between the end portion of first side surface 121p1 on the − side in the Z direction and the end portion of second side surface 121q1 on the + side in the Z direction. In the present modification, stopper step 121n1 and side stopper step 121r1 serve as flow stopper part 121a.

FIGS. 14A and 14B describe a second modification of flow stopper part 121a. FIG. 14A is a schematic view of a part of the stopper protrusion as viewed in the direction of arrow A₁ of FIG. 12, and FIG. 14B is a schematic view of a part of the stopper protrusion as viewed in the direction of arrow A₂ of FIG. 12.

In stopper protrusion 121B illustrated in FIGS. 14A and 14B, wire opposing surface 121h2 includes flow stop protrusion 121s1 extending in the width direction of wire opposing surface 121h2 (the horizontal direction in FIG. 14B) at a center part in the Z direction (the vertical direction in FIGS. 14A and 14B).

Side outer surface 121i2 includes, at a center part in the Z direction, side flow stopper protrusion 121s2 extending in the width direction of side outer surface 121i2 (in FIG. 14A, the horizontal direction). In the present modification, flow stopper protrusion 121s1 and side flow stopper protrusion 121s2 serve as flow stopper part 121a. Note that, the positions, sizes, numbers and the like of flow stop protrusion 121s1 and side flow stop protrusion 121s2 are not limited to those described in the present modification.

Figure 15A:
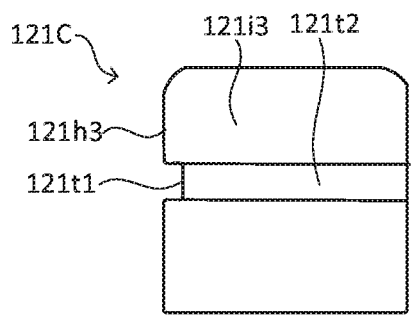
FIGS. 15A and 15B are drawings for describing a flow stopper part of modification 3.
Figure 15B:
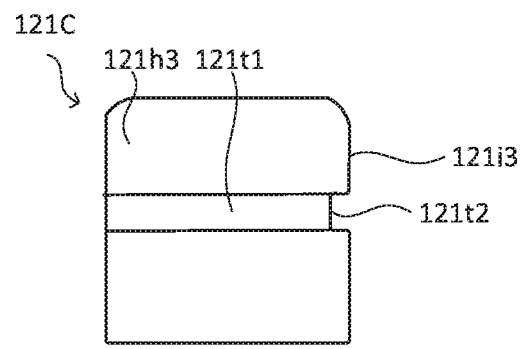

FIGS. 15A and 15B describe a third modification of flow stopper part 121a. FIG. 15A is a schematic view of a part of the stopper protrusion as viewed in the direction of arrow A₁ of FIG. 12, and FIG. 15B is a schematic view of a part of the stopper protrusion as viewed in the direction of arrow A₂ of FIG. 12.

In stopper protrusion 121C illustrated in FIGS. 15A and 15B, wire-opposing surface 121h3 includes, at a center part in the Z direction, flow stopper groove 121t1 extending in the width direction of wire-opposing surface 121h3 (in FIG. 15B, the horizontal direction).

Side outer surface 121i3 includes, at a center part in the Z direction, side flow stopper groove 121t2 extending in the width direction of side outer surface 121i3 (in FIG. 15A, the horizontal direction). In the present modification, flow stopper groove 121t1 and side flow stopper groove 121t2 serve as flow stopper part 121a. Note that, the positions, sizes, numbers and the like of flow stopper groove 121t1 and side flow stopper groove 121t2 are not limited to those described in the present modification.

Figure 16A:
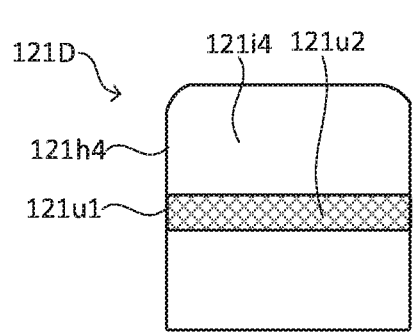
FIG. 16A is a schematic view of the stopper protrusion as viewed from the direction of arrow $A_1$ of FIG. 12.
Figure 16B:
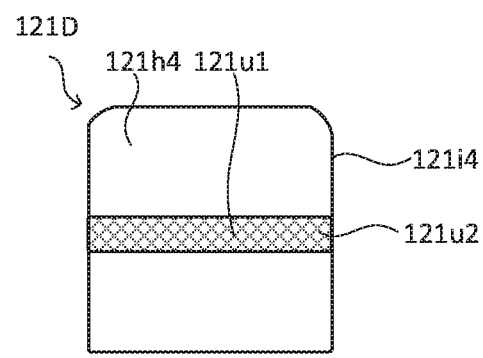
FIG. 16B is a schematic view of the stopper protrusion as viewed from the direction of arrow $A_2$ of FIG. 12.

FIGS. 16A and 16B describe a fourth modification of flow stopper part 121a. FIG. 16A is a schematic view of a part of the stopper protrusion as viewed in the direction of arrow A₁ of FIG. 12, and FIG. 16B is a schematic view of a part of the stopper protrusion as viewed in the direction of arrow A₂ of FIG. 12.

In stopper protrusion 121D illustrated in FIGS. 16A and 16B, wire opposing surface 121h4 includes, at a center part (the hatched portion in FIG. 16B) in the Z direction (the vertical direction in FIGS. 16A and 16B), grain formation part 121u1 having an irregular pattern such as wrinkles over the entire length in the width direction of wire opposing surface 121h4 (in FIG. 16B, the horizontal direction).

Side outer surface 121i4 includes, at a center part in the Z direction (the hatched portion in FIG. 16A), side grain formation part 121u2 having an irregular pattern such as wrinkles over the entire length in the width direction of side outer surface 121i4 (in FIG. 16A, the horizontal direction).

In the present modification, grain formation part 121u1 and side grain formation part 121u2 serve as flow stopper part 121a. The irregular patterns of grain formation part 121u1 and side grain formation part 121u2 may be appropriately selected. Positions, sizes, numbers and the like of grain formation part 121u1 and side grain formation part 121u2 are not limited to those described in the present modification. The structures of flow stopper part 121a may be appropriately combined.

In the present embodiment, as with lens holder 110, magnet holder 12a is formed with polyarylate (PAR) or a PAR alloy composed of different types of resins including PAR (e.g., PAR/PC).

With this configuration, a high welding power can be achieved, and thus toughness and impact resistance can be ensured even when magnet holder 12a is thinned Accordingly, a small external size of lens driving device 1 can be achieved, and downsizing and weight reduction can be achieved.

Magnet Part

Magnet part 125 includes four rectangular columnar permanent magnets, 125A to 125D. Permanent magnets 125A to 125D are fixed to magnet installation part 120c by bonding, for example. In the present embodiment, in plan view, each of permanent magnets 125A to 125D has a substantially isosceles trapezoidal shape.

Figure 17:
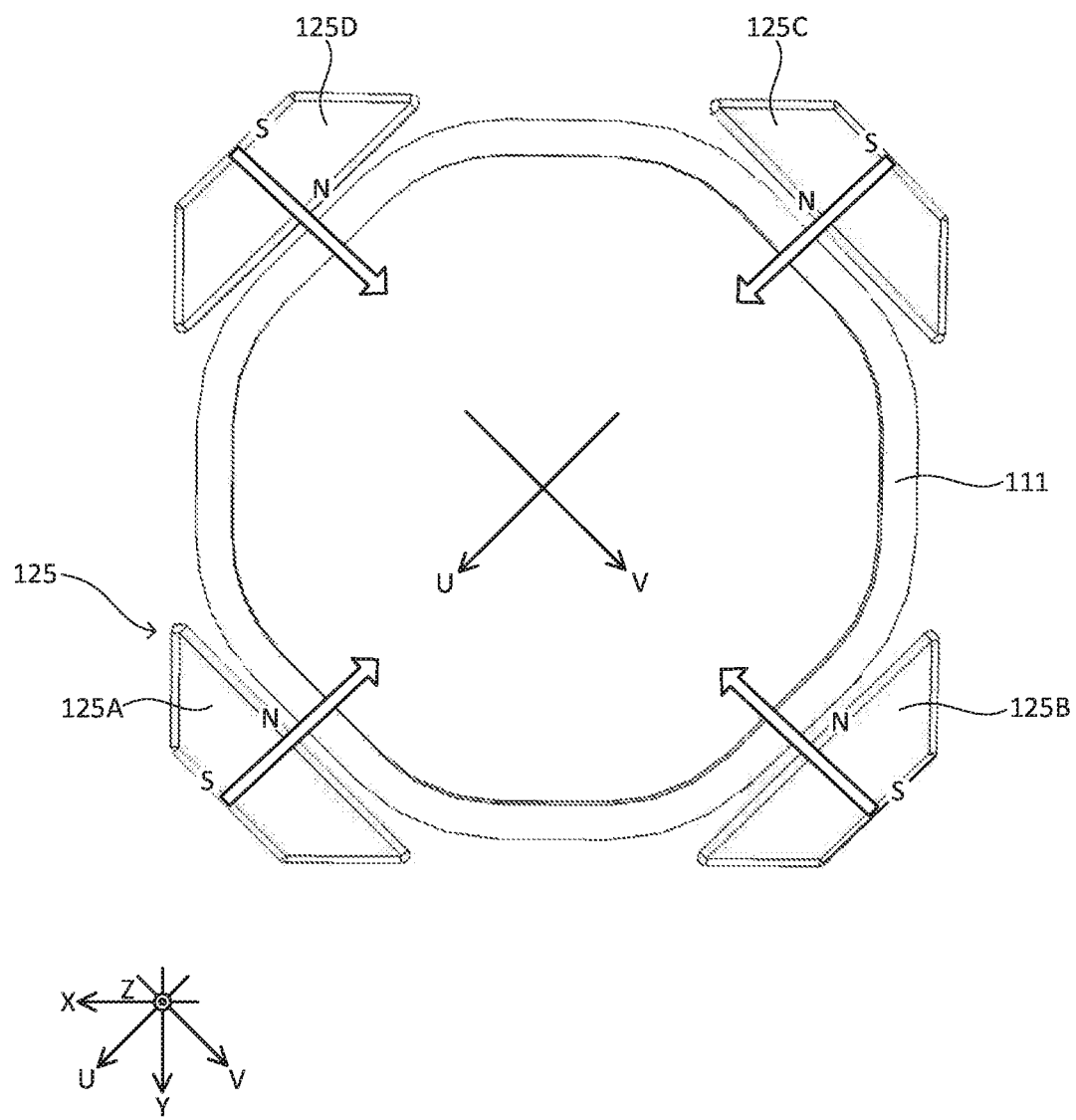
FIG. 17 is a plan view illustrating a direction of a magnetic field at an AF movable part.

With this configuration, the corner spaces of magnet holder 12a (specifically, magnet installation part 120c) can be effectively utilized. As illustrated in FIG. 17, permanent magnets 125A to 125D are magnetized such that a traversing magnetic field in the radial direction is formed at AF coil part 111. In the present embodiment, permanent magnets 125A to 125D are magnetized such that the inner periphery side and the outer periphery side thereof are set to N pole and S pole, respectively.

The end surfaces (lower surfaces) of permanent magnets 125A to 125D on the − side in the Z direction protrude to the − side in the Z direction over magnet holder 12a (see FIG. 6). That is, the height of OIS movable part 10 is defined by permanent magnets 125A to 125D. With this configuration, the height of OIS movable part 10 can be minimized in accordance with the size of permanent magnets 125A to 125D for ensuring the magnetic force, and thus height reduction of lens driving device 1 can be achieved.

The AF voice coil motor is configured with magnet part 125 and AF coil part 111 with the above-mentioned configuration. In addition, magnet part 125 serves as the AF magnet part and as the OIS magnet part.

Upper Elastic Supporting Part

As illustrated in FIG. 9A, upper elastic supporting part 13 (hereinafter referred to as "upper leaf spring 13") is composed of a pair of upper spring elements 13a and 13b. Each of upper spring elements 13a and 13b is a leaf spring composed of beryllium copper, nickel copper, stainless-steel or the like.

Of upper spring elements 13a and 13b, upper spring element 13a includes outer fixing part 130 configured to be fixed to the surface of magnet holder 12a on the + side in the Z direction (specifically, upper spring fixing part 120e1), and inner fixing part 131 configured to be fixed to the surface of lens holder 110 on the + side in the Z direction (specifically, upper spring fixing part 110f). Note that the structure of upper spring element 13b is similar to the structure of upper spring element 13a. In view of this, the parts of upper spring element 13b similar to those of upper spring element 13a are denoted with the same reference numerals as those of upper spring element 13a, and detailed description thereof is omitted.

Outer fixing part 130 and inner fixing part 131 can be relatively displaced in the Z direction. To achieve such relative displacement, in the present embodiment, upper spring element 13a includes displacement permission part 132 that allows for relative displacement of outer fixing part 130 and inner fixing part 131 based on the elastic deformation thereof.

Specifically, outer fixing part 130 includes a pair of wire fixing parts 130a and 130b. Wire fixing parts 130a and 130b are disposed on the + side, in the Z direction, of arc grooves 120a of magnet holder 12a (see FIG. 6) where suspension wires 30A and 30B are disposed (i.e., on the + side of the first corner part and the second corner part in the Z direction). In upper spring element 13b, wire fixing parts 130a and 130b are disposed on the + side, in the Z direction, of arc grooves 120a of magnet holder 12a where suspension wires 30C and 30D are disposed (i.e., on the + side of the third corner part and the fourth corner part in the Z direction).

Then, the other ends (upper ends) of suspension wires 30A and 30B (in the case of upper spring element 13b, suspension wires 30C and 30D) are fixed to wire fixing parts 130a and 130b by soldering.

Outer fixing part 130 includes a pair of first outer through holes 130c and 130d to which stopper protrusions 121 of magnet holder 12a are inserted.

Further, outer fixing part 130 includes a plurality of (the present embodiment, four) second outer through holes 130e to which upper bosses 120f1 (in the case of upper spring element 13b, upper bosses 120f2) of magnet holder 12a are inserted.

Inner fixing part 131 is disposed inside outer fixing part 130 in the radial direction. Inner fixing part 131 includes a pair of inner through holes 131a to which upper bosses 110g (in the case of upper spring element 13b, upper bosses 110i) of lens holder 110 is inserted.

Displacement permission part 132 is composed of a pair of displacement permission elements 132a and 132b. Displacement permission elements 132a and 132b are slender members extending in the circumferential direction, and connect between inner fixing part 131 and outer fixing part 130. Displacement permission elements 132a and 132b include therein meandering parts 132c and 132d, respectively.

Note that the pair of upper spring elements 13a and 13b is connected to AF coil part 111 by soldering at the pair of tying parts 110n.

Lower Elastic Supporting Part

Figure 9B:
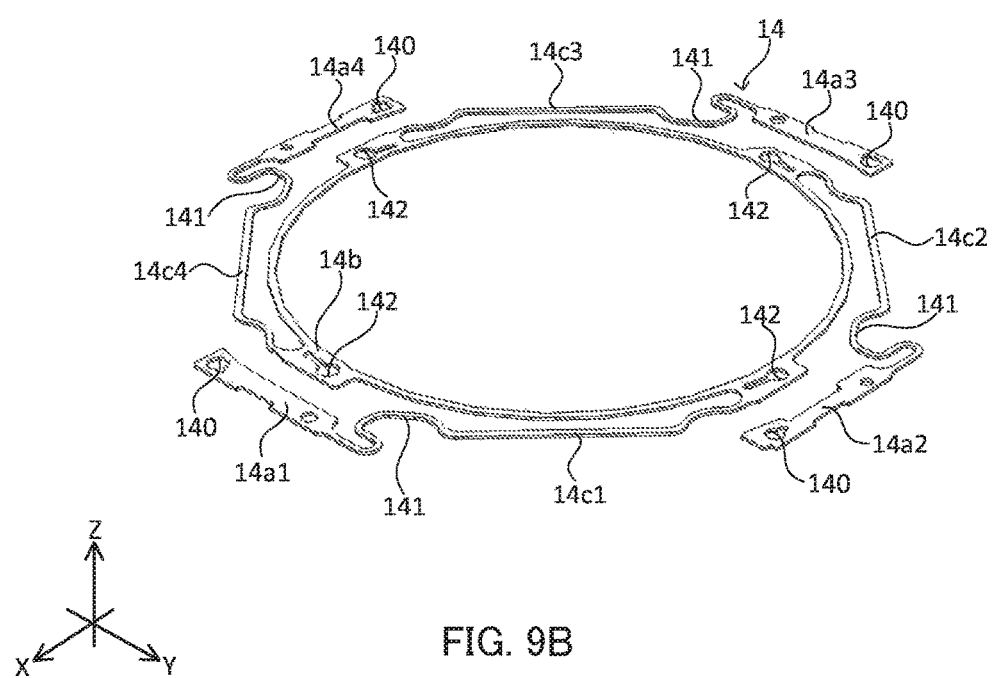
FIG. 9B is a perspective view of a lower elastic supporting part.

As illustrated in FIG. 9B, lower elastic supporting part 14 (hereinafter referred to as "lower leaf spring 14"), as with upper leaf spring 13, is a leaf spring made of beryllium copper, nickel copper, stainless-steel or the like for example, and has a square shape in its entirety in plan view. Lower leaf spring 14 elastically supports AF movable part 11 with respect to AF fixing part 12.

Lower leaf spring 14 includes four outer fixing parts 14a1 to 14a4 configured to be fixed to magnet holder 12a (specifically, lower spring fixing part 120d), and inner fixing part 14b configured to be fixed to lens holder 110 (specifically, lower spring fixing parts 110k).

Outer fixing parts 14a1 to 14a4 and inner fixing part 14b can be relatively displaced in the Z direction. To achieve such relative displacement, in the present embodiment, lower leaf spring 14 includes displacement permission parts 14c1 to 14c4 that allow for relative displacement of outer fixing parts 14a1 to 14a4 and inner fixing part 14b based on the elastic deformation thereof.

Specifically, each of outer fixing parts 14a1 to 14a4 includes outer through hole 140 to which lower boss 120d1 of magnet holder 12a is inserted. Note that the structure of outer fixing part is not limited to that of the present embodiment.

Inner fixing part 14b has a circular shape, and disposed inside outer fixing parts 14a1 to 14a4 in the radial direction. Inner fixing part 14b having such a configuration includes, at four places shifted from each other by 90 degrees in the circumferential direction, inner through hole 142 to which lower boss 110m of lower spring fixing part 110k of lens holder 110 is inserted.

Note that, in the present embodiment, inner through holes 142 and outer fixing parts 14a1 to 14a4 are disposed in a positional relationship in substantially the same phase in the circumferential direction. Note that the structure of the inner fixing part is not limited to that of the present embodiment.

Each of displacement permission parts 14c1 to 14c4 is a slender member extending in the circumferential direction, and connects between outer fixing parts 14a1 to 14a4 and inner fixing part 14b. Each of displacement permission parts 14c1 to 14c4 includes therein meandering part 141.

Specifically, one end (also referred to as inner end in the radial direction) of each of displacement permission parts 14c1 to 14c4 is connected with a portion near a portion where inner through hole 142 is provided in inner fixing part 14b. On the other hand, the other ends (also referred to as outer end in the radial direction) of displacement permission parts 14c1 to 14c4 are respectively connected with outer fixing parts 14a1 to 14a4 provided at positions shifted from each other by approximately 90 degrees from the portion where one ends of displacement permission parts 14c1 to 14c4 are fixed.

OIS Fixing Part

Figure 18:
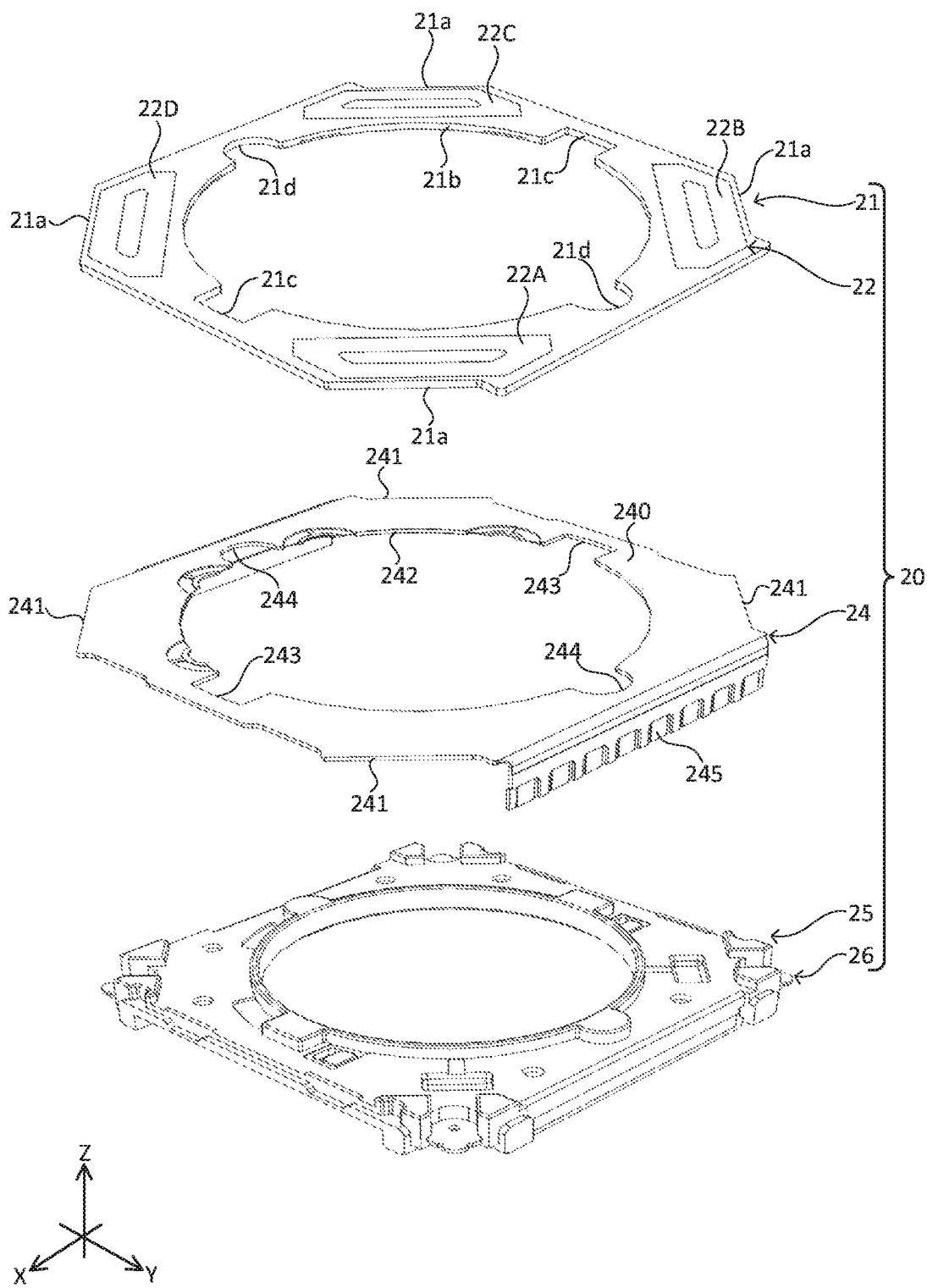
FIG. 18 is an exploded perspective view of an OIS fixing part.
Figure 19:
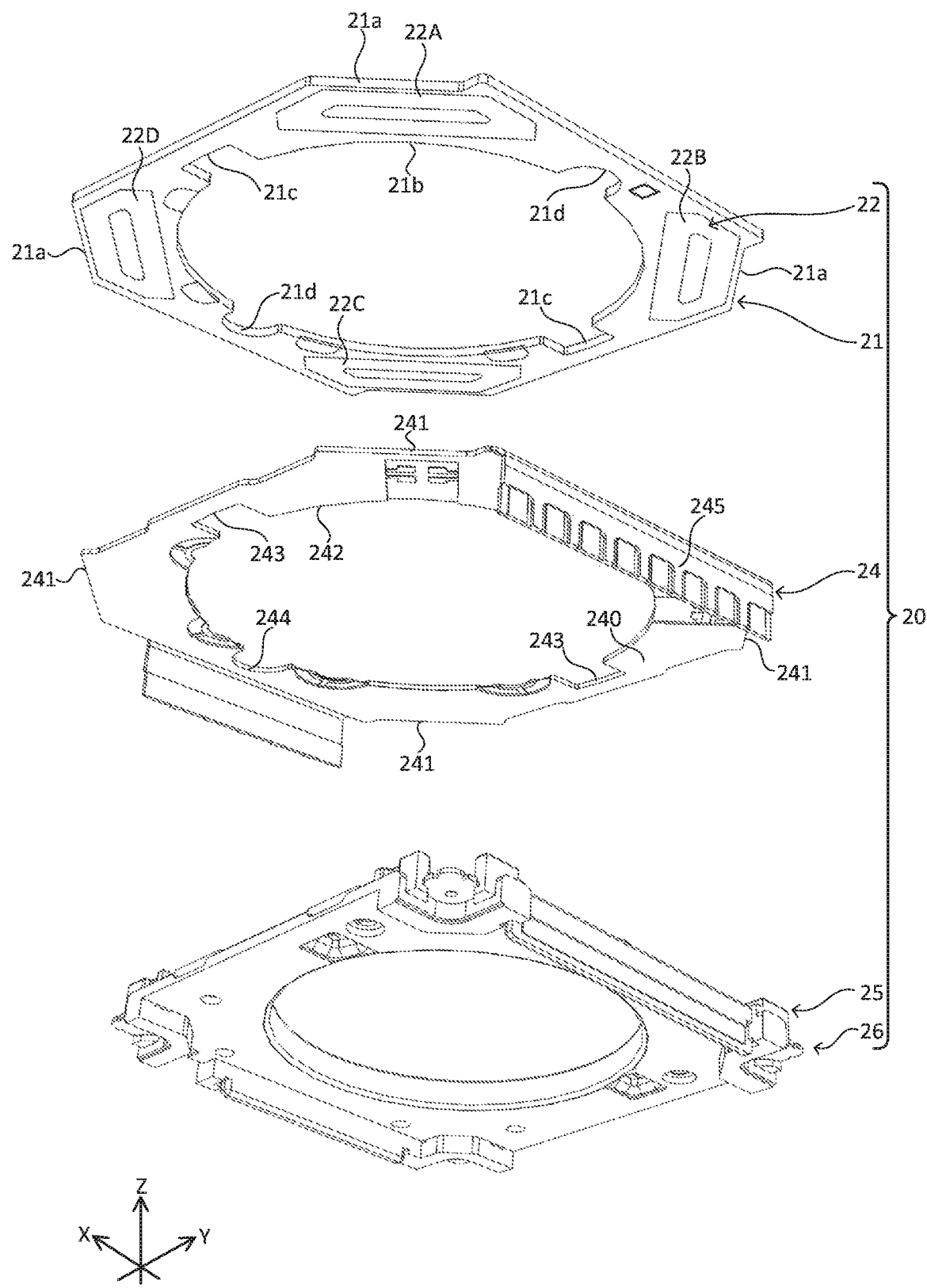
FIG. 19 is an exploded perspective view of the OIS fixing part as viewed from an angle different from FIG. 18.

FIGS. 18 and 19 are exploded perspective views of OIS fixing part 20. As illustrated in FIGS. 18 and 19, OIS fixing part 20 includes coil substrate 21, FPC 24, base member 25, lead 26 and the like.

Coil Substrate

Coil substrate 21 is a substrate having a substantially octagonal shape in plan view with chamfered parts 21a at the four corners thereof. Center parts of suspension wires 30A to 30D are located outside chamfered parts 21a in the radial direction. Accordingly, suspension wires 30A to 30D are not locked by coil substrate 21.

Coil substrate 21 includes circular opening 21b at the center thereof. Coil substrate 21 includes a pair of first cutouts 21c at portions opposite to each other in the first direction (e.g., the X direction) at the inner peripheral edge of opening 21b.

In addition, oil substrate 21 includes a pair of first cutouts 21d at portions opposite to each other in the second direction (e.g., the Y direction) at the inner peripheral edge of opening 21b. That is, first cutouts 21c and second cutouts 21d are alternately provided in the circumferential direction at intervals of 90 degrees at the inner peripheral edge of opening 21b.

Each first cutout 21c has a rectangular shape as viewed in plan view in the Z direction. On the other hand, each second cutout 21d has a semicircular shape as viewed in plan view in the Z direction. First cutouts 21c and second cutouts 21d are configured to position coil substrate 21 with respect to base member 25 described later.

Coil substrate 21 includes OIS coil part 22 at positions opposite to magnet parts 125 (see FIGS. 7 and 8) in the Z direction (optical axis direction). OIS coil part 22 includes four OIS coils, 22A to 22D, corresponding to permanent magnets 125A to 125D.

The sizes and/or installation positions of OIS coils 22A to 22D and permanent magnets 125A to 125D are set such that the magnetic fields radiated from the bottom surfaces of permanent magnets 125A to 125D respectively traverse the long side portions of OIS coils 22A to 22D in the Z direction. Magnet part 125 and OIS coil part 22 serve as an OIS voice coil motor.

FPC

As illustrated in FIGS. 18 and 19, FPC 24 includes FPC main body 240 having a substantially octagonal shape in plan view with chamfered parts 241 at the four corners as with coil substrate 21. Center parts of suspension wires 30A to 30D are located outside chamfered parts 241 in the radial direction. Accordingly, suspension wires 30A to 30D are not locked by FPC 24.

FPC main body 240 includes, at the center thereof, circular opening 242. FPC main body 240 includes a pair of first cutouts 243 at two portions opposite to each other in the first direction (e.g., the X direction) at the inner peripheral edge of opening 242.

In addition, FPC main body 240 includes a pair of second cutouts 244 at two portions opposite to each other in the second direction (e.g., the Y direction) at the inner peripheral edge of opening 242. That is, first cutouts 243 and second cutouts 244 are alternately provided at intervals of 90 degrees in the circumferential direction at the inner peripheral edge of opening 21b.

Each first cutout 243 has a rectangular shape as viewed in plan view in the Z direction. On the other hand, each second cutout 244 has a semicircular shape as viewed in plan view in the Z direction. First cutouts 243 and second cutouts 244 are configured to position FPC 24 with respect to base member 25 described later.

FPC 24 includes a pair of terminal parts 245 at two sides opposite to each other in the first direction (e.g., the Y direction) in FPC main body 240, and terminal parts 245 are bent downward from the two sides. A power source terminal and a signal terminal are disposed at the pair of terminal parts 245.

Base Member

Figure 20A:
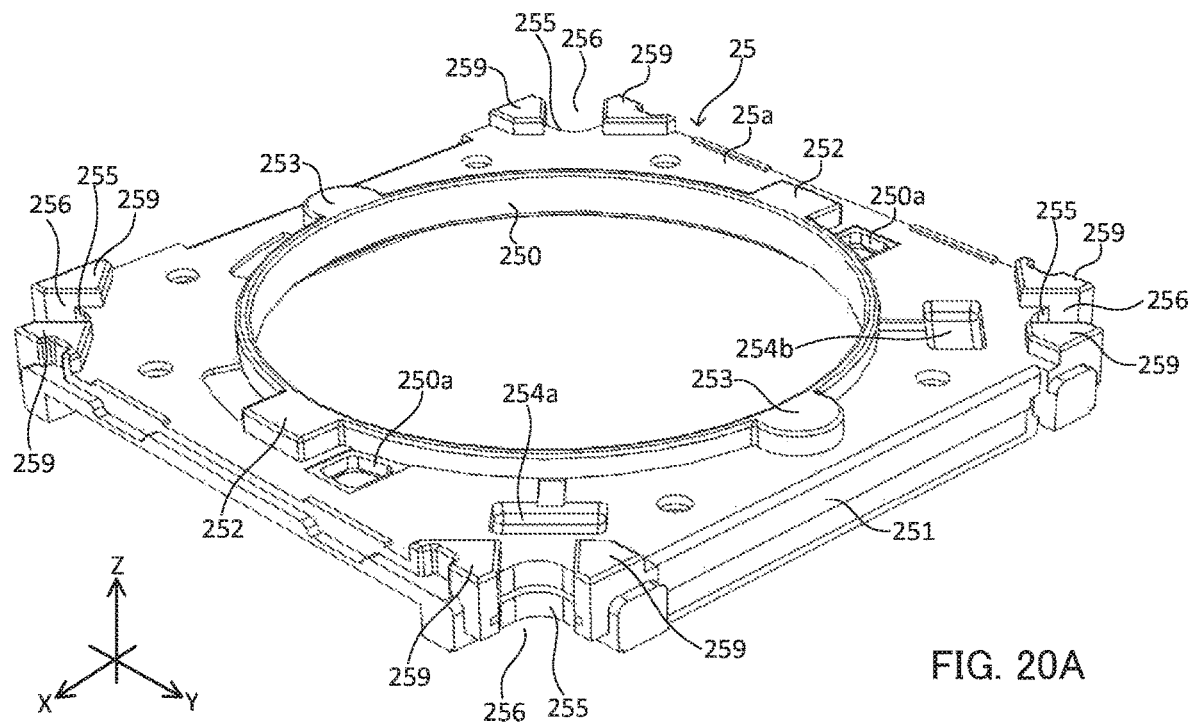
FIGS. 20A and 20B are exploded perspective views of a base member and a lead.
Figure 20B:
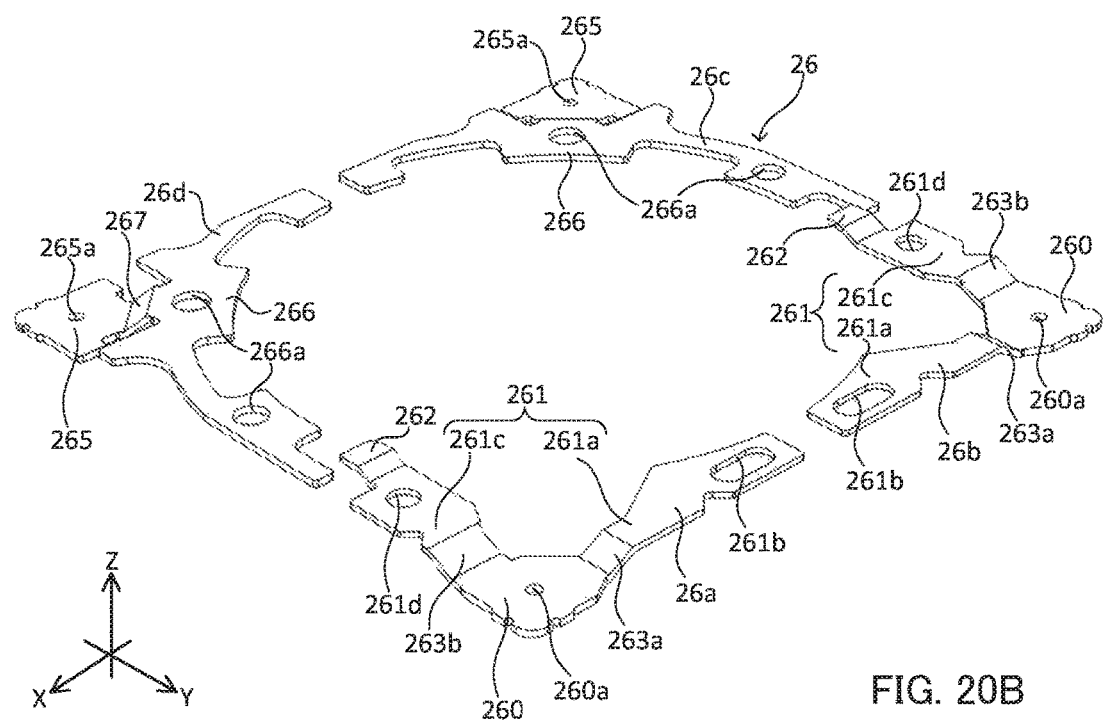
Figure 21A:
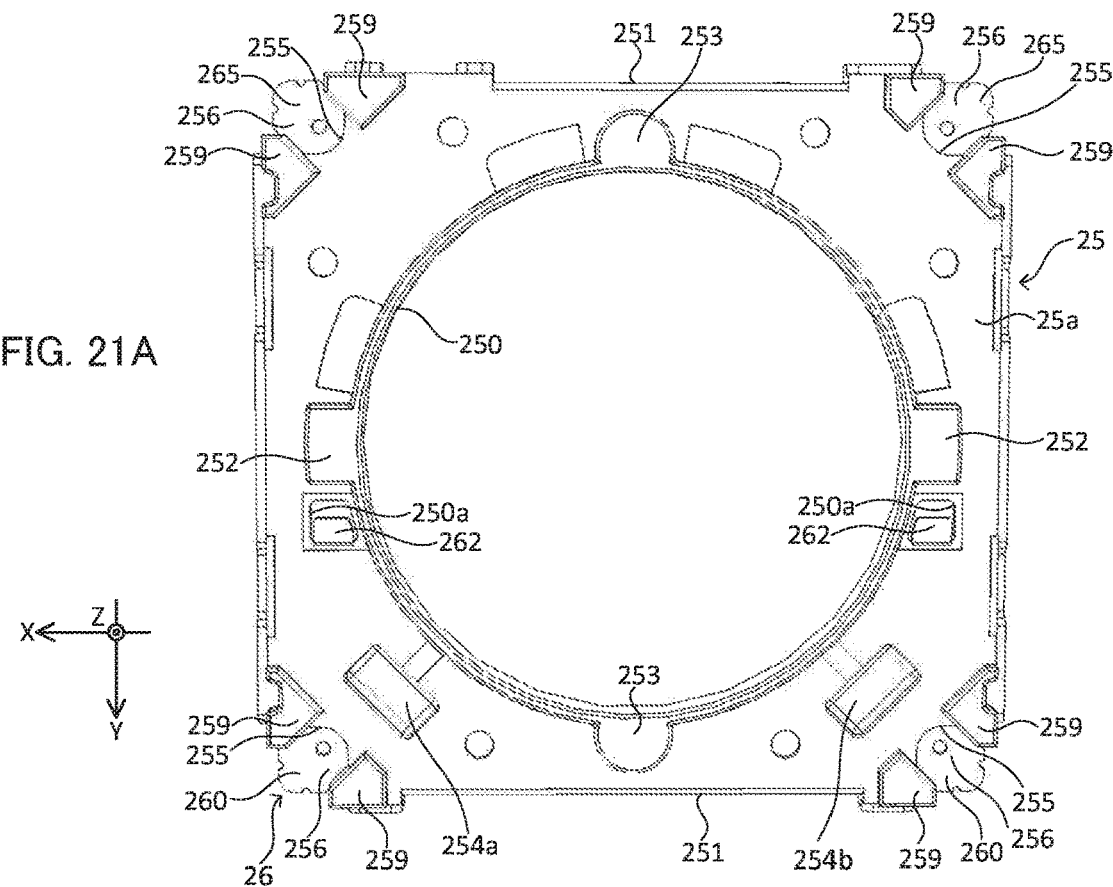
FIGS. 21A and 21B illustrate a configuration of the base.
Figure 21B:
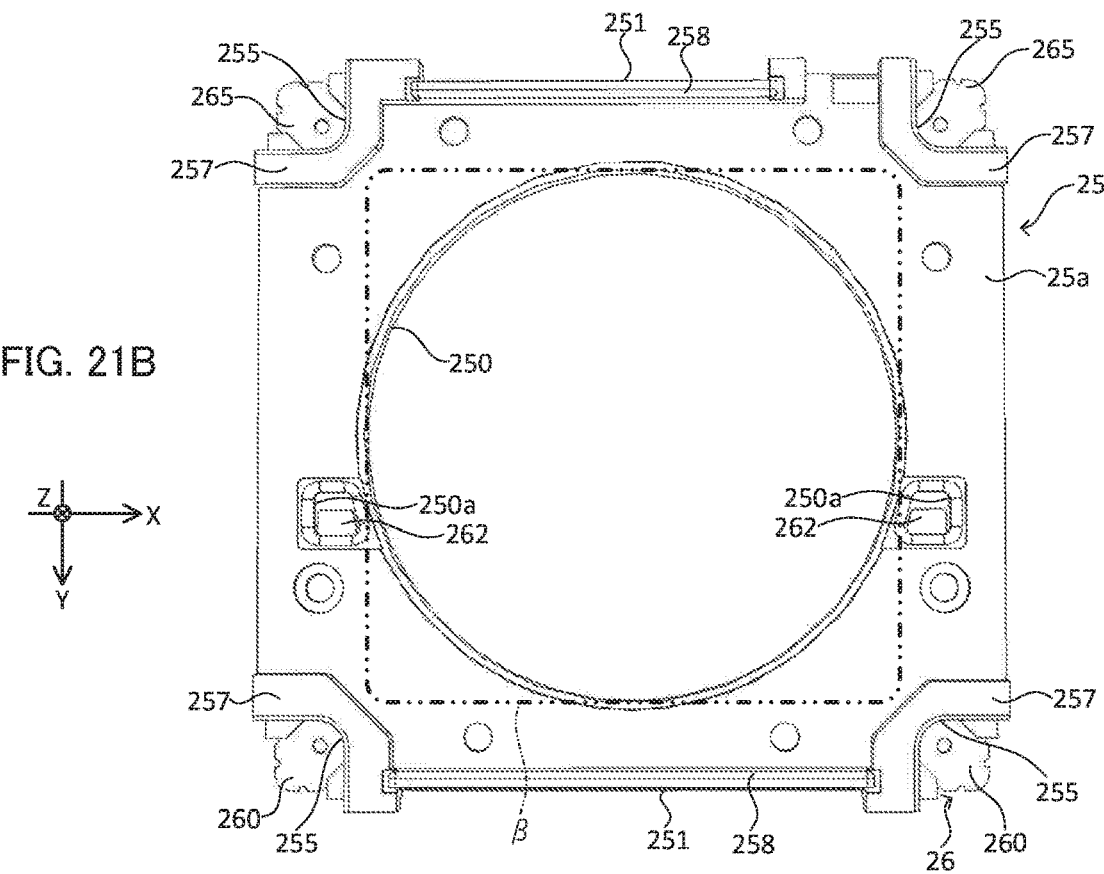

FIG. 20A is a perspective view of base member 25, and FIG. 20B is a perspective view of lead 26. Base member 25 is a supporting member that supports coil substrate 21. FIG. 21A is a plan view of base member 25 in which lead 26 is embedded, and FIG. 21B is a bottom view of base member 25 in which lead 26 is embedded.

Base member 25 is made of a non-conductive material such as synthetic resins. For example, base member 25 is made of liquid crystal polymer (LCP), and includes base main body 25a that is a plate member having a substantially square shape in plan view.

Base main body 25a includes, at the peripheral surface thereof, a pair of terminal attaching portions 251 at positions corresponding to the pair of terminal parts 245.

Base main body 25a includes circular opening 250 at the center thereof. Base main body 25a includes first protrusions 252 at two positions opposite to each other in the first direction (e.g., the X direction) at the periphery of opening 250.

First protrusion 252 has a rectangular shape in plan view in the Z direction. At first protrusion 252, first cutout 21c of coil substrate 21 and first cutout 243 of FPC 24 are locked in this order from the + side in the Z direction.

In addition, base main body 25a includes second protrusions 253 at two positions opposite to each other in the second direction (e.g., the Y direction) at the periphery of opening 250. Second protrusion 253 has a semicircular shape as viewed in plan view in the Z direction. At second protrusion 253, second cutout 21d of coil substrate 21 and second cutout 244 of FPC 24 are locked in this order from the + side in the Z direction.

Base main body 25a includes Hall-device recesses 254a and 254b at two corners on + side in the Y direction on the surface on the + side in the Z direction (top surface) (i.e., the first corner part and the second corner part). In the assembled state, Hall-device recesses 254a and 254b are located on the − side in the Z direction of OIS coils 22A and 22B on + side in the Y direction of OIS coils 22A to 22D.

Hall devices 23A and 23B (see FIG. 8) are housed in Hall-device recesses 254a and 254b. Hall devices 23A and 23B are disposed on the surface (rear surface) of FPC 24 on the − side in the Z direction. By detecting the magnetic field formed by magnet part 125 with Hall devices 23A and 23B, the position of OIS movable part 10 in the plane orthogonal to the optical axis can be specified.

Base main body 25a includes a pair of through holes 250a extending through base main body 25a in the Z direction at positions on both sides of opening 250 in the X direction. Conduction pieces 262 of first lead elements 26a and 26b of lead 26 described later are disposed at through holes 250a.

Base main body 25a includes at the four corners thereof lead cutout parts 255 (also referred to as cutout parts) recessed inward in the radial direction. Lead installation spaces 256 are defined at portions surrounded by lead cutout parts 255. Lead installation spaces 256 open to both sides in the Z direction, and to the outside in the radial direction.

Base main body 25a includes, on the top surface thereof, pairs of first reinforcement ribs 259 at the peripheries of lead cutout parts 255.

Base main body 25a includes, on the surface (lower surface) on the − side in the Z direction, base leg parts 257 protruding from the lower surface to the − side in the Z direction at the peripheries of lead cutout parts 255. Each base leg part 257 has a substantially L-shape as viewed in plan view in the Z direction, and the outer surface of base leg part 257 in the radial direction is continuous with the outer surface of lead cutout part 255 in the Z direction.

The end portion (front end portion) on the − side in the Z direction of base leg part 257 is located on the − side in the Z direction relative to base main body 25a. A half part of lead installation space 256 on the − side in the Z direction is formed in a portion surrounded by base leg part 257. With base leg part 257, lead installation space 256 can be expanded to the − side in the Z direction in comparison with a configuration in which no base leg part 257 is provided.

In addition, in the assembled state, base leg part 257 can be lengthened to the − side in the Z direction as long as base leg part 257 does not make contact with the sensor substrate of the image pickup part.

Base main body 25a includes, on the surface (lower surface) of base main body 25a on the − side in the Z direction, second base leg parts 258 protruding from the lower surface to the − side in the Z direction at positions along the two sides opposite to each other in the first direction (e.g., the Y direction). The position of the end surface (tip end surface) of each second base leg part 258 on the − side in the Z direction is located on the − side in the Z direction relative to the tip end surface of base leg part 257.

Each of first reinforcement ribs 259, base leg parts 257, and second base leg parts 258 increases the mechanical strength of base main body 25a. Thus, reduction in the thickness of base main body 25a can be achieved.

Base main body 25a is attached to cover 4 by applying an adhesive agent (e.g., epoxy resin) to a portion surrounded by base leg part 257 in lead installation space 256.

Note that in the assembled state of camera module A, the imaging device (not illustrated) held by the sensor base (not illustrated) is disposed at the position indicated with the chain double-dashed line β on the − side of base main body 25a in the Z direction in FIG. 21B. The sensor base having the above-mentioned configuration is fixed to the top surface (the surface on the + side in the Z direction) of the sensor substrate (not illustrated). In such an assembled state, the tip end surface (the surface on the − side in the Z direction) of base leg part 257 of base member 25 does not make contact with the sensor substrate.

Lead

Figure 22:
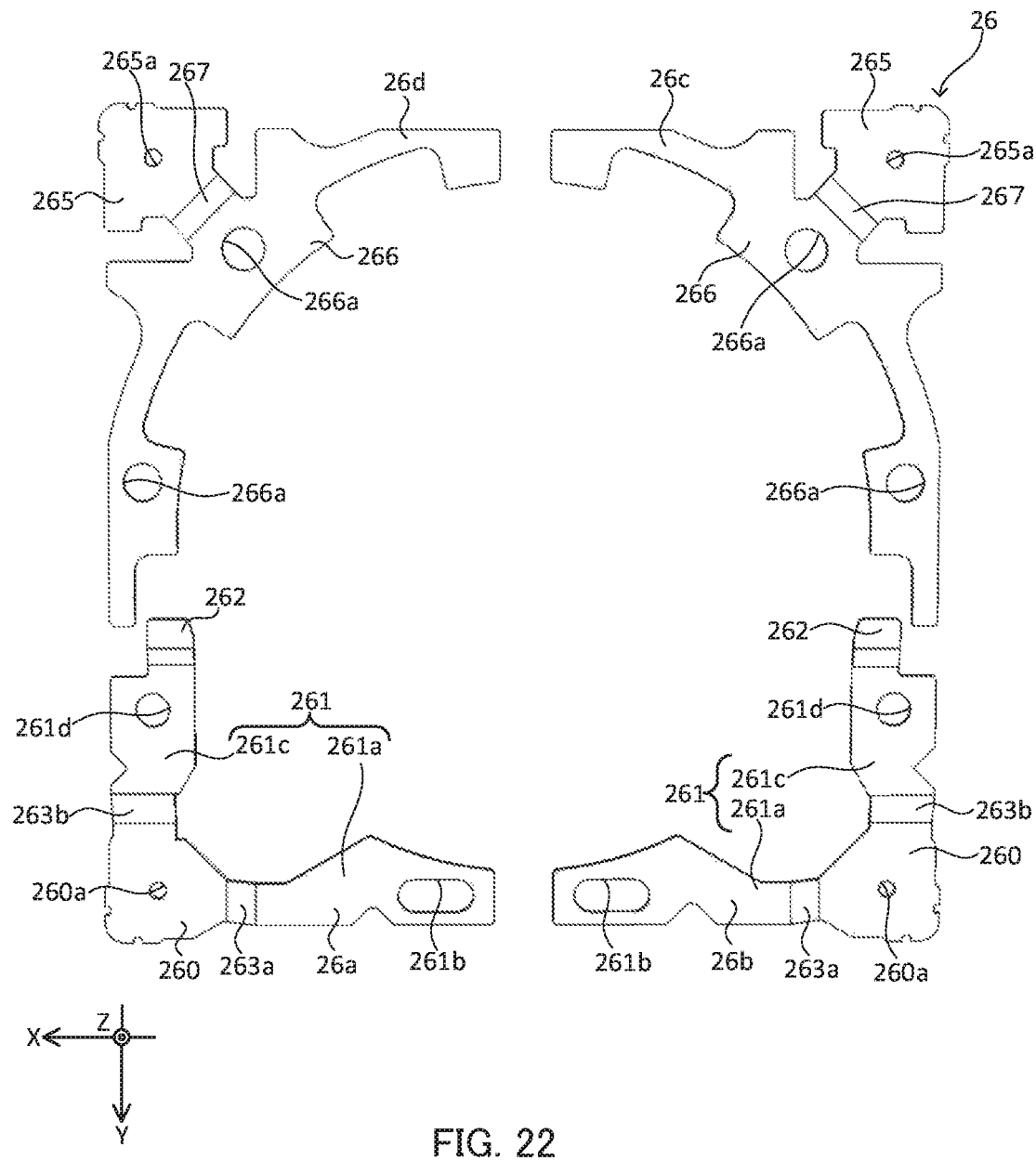
FIG. 22 is a plan view of the lead.

As illustrated in FIGS. 20B and 22, lead 26 (also referred to as wire connecting part) is, for example, a leaf spring made of a conductive material such as beryllium copper, nickel copper, and stainless-steel, and includes a main body (e.g., first lead main body 261 and second lead main body 266 described later) and a plurality of (in the present embodiment, four) wire connecting parts (e.g., first wire connecting part 260 and second wire connecting part 265 described later).

The main body part is embedded in base member 25. On the other hand, each wire connecting part is exposed from base member 25. For example, the wire connecting parts exposed from base member 25 at the first to fourth corner parts.

Each wire connecting part is located on the − side in the Z direction relative to the main body part (or in other words, located at a position remote from OIS movable part 10). One ends (lower ends) of suspension wires 30A to 30D are fixed to respective wire connecting parts.

Now, details of the configuration of lead 26 is described with reference to FIGS. 20B and 22. Lead 26 includes a pair of first lead elements 26a and 26b and a pair of second lead elements 26c and 26d, each of which has a substantially L-shape. The pair of first lead elements 26a and 26b and the pair of second lead elements 26c and 26d are disposed so as to form a frame having a substantially rectangular shape.

Specifically, the pair of first lead elements 26a and 26b are adjacent to each other in the X direction at the first corner part and the second corner part, respectively. On the other hand, the pair of second lead elements 26c and 26d are adjacent to each other in the X direction at the third corner part and the fourth corner part, respectively.

Each of first lead elements 26a and 26b includes first wire connecting part 260 (also referred to as wire connecting part) and first lead main body 261 (also referred to as main body part).

First wire connecting parts 260 are plate members each having a substantially triangular shape as viewed in plan view in the Z direction, and include first through holes 260a through which one ends of (lower end) of suspension wires 30A and 30B can be inserted. Each first lead main body 261 includes first main body element 261a and first main body element 261c extending in directions orthogonal to each other (e.g., the X direction and the Y direction) from first wire connecting part 260.

First main body element 261a includes positioning hole 261b at the front end portion thereof. A part of the resin that forms base member 25 is supplied to positioning hole 261b. The base end of first main body element 261a is connected with first wire connecting part 260 through first step 263a (also referred to as step).

First step 263a is tilted in a direction approaching first wire connecting part 260 toward the − side in the Z direction. In the present embodiment, first step 263a is embedded in base member 25. Note that first step 263a is not limited to the configuration illustrated in the drawing, and may be, for example, parallel to the Z direction. That is, first step 263a may be orthogonal to first main body element 261a and first wire connecting part 260.

On the other hand, first main body element 261c includes, at the front end portion thereof, conduction piece 262 bent to the + side in the Z direction. When disposed at through hole 250a of base member 25, conduction piece 262 is exposed at the surface of base member 25 from base member 25.

The portion exposed from base member 25 of conduction piece 262 makes contact with the power source part (not illustrated) provided at the rear surface (i.e., the surface on the − side in the Z direction) of FPC 24. With this configuration, the pair of first lead elements 26a and 26b and FPC 24 are electrically connected to each other.

First main body element 261c includes positioning hole 261d at a center part thereof. A part of the resin that forms base member 25 is supplied to positioning hole 261d. The base end of first main body element 261c is continuous with first wire connecting part 260 through first step 263b (also referred to as step).

First step 263b is tilted in a direction approaching first wire connecting part 260 toward the − side in the Z direction. In the present embodiment, first step 263b is embedded in base member 25. Note that first step 263b is not limited to the configuration illustrated in the drawing, and may be, for example, parallel to the Z direction. That is, first step 263b may be orthogonal to first main body element 261c and first wire connecting part 260.

With the above-mentioned configuration, first wire connecting part 260 is located on the − side in the Z direction relative to first lead main body 261 (i.e., first main body element 261a and first main body element 261c).

First lead element 26a is disposed at the first corner part of base member 25. In such a state, first main body element 261a, first main body element 261c, first step 263a, and first step 263b of first lead element 26a are embedded in base member 25.

First wire connecting part 260 of first lead element 26a is disposed in lead installation space 256 of the first corner part of base member 25 in the state where first wire connecting part 260 is exposed from base member 25.

On the other hand, first lead element 26b is disposed at the second corner part of base member 25. In such a state, first main body element 261a, first main body element 261c, first step 263a, and first step 263b of first lead element 26b are embedded in base member 25.

First wire connecting part 260 of first lead element 26b is disposed in lead installation space 256 of the second corner part of base member 25 in the state where first wire connecting part 260 is exposed from base member 25.

Each of second lead elements 26c and 26d includes second wire connecting part 265 (also referred to as wire connecting part) and second lead main body 266 (also referred to as main body part).

Second wire connecting parts 265 are plate members each having a substantially triangular shape as viewed in plan view in the Z direction, and include second through holes 265a through which one ends (lower ends) of suspension wires 30C and 30D can be inserted.

Second lead main body 266 is a plate member having a substantially arc-like shape as viewed in plan view in the Z direction, and is disposed inside second wire connecting part 265 in the radial direction. Second lead main body 266 includes two positioning holes, 266a. A part of the resin that forms base member 25 is supplied to each positioning hole 266a.

A center part of second lead main body 266 is connected with second wire connecting part 265 through second step 267. Second step 267 is tilted in a direction approaching second wire connecting part 265 toward the − side in the Z direction. Note that second step 267 is not limited to the configuration illustrated in the drawing, and may be parallel to the Z direction for example. That is, second step 267 may be orthogonal to second lead main body 266 and second wire connecting part 265.

Accordingly, second wire connecting part 265 is located on the − side in the Z direction relative to second lead main body 266. In the present embodiment, second step 267 is embedded in base member 25.

Second lead element 26c is disposed at the third corner part in base member 25. In such a state, second lead main body 266 and second step 267 of second lead element 26c are embedded in base member 25.

Second wire connecting part 265 of second lead element 26c is disposed in lead installation space 256 of the third corner part of base member 25 in the state where second wire connecting part 265 is exposed from base member 25.

On the other hand, second lead element 26d is disposed at the fourth corner part in base member 25. In such a state, second lead main body 266 and second step 267 of second lead element 26d are embedded in base member 25.

Second wire connecting part 265 of second lead element 26d is disposed in lead installation space 256 of the fourth corner part of base member 25 in the state where second wire connecting part 265 is exposed from base member 25.

Assembly of OIS Movable Part and OIS Fixing Part

When OIS fixing part 20 and OIS movable part 10 having the above-mentioned configurations are combined to assemble lens driving device 1, the other ends of (upper ends) of suspension wires 30A and 30B are respectively inserted to the pair of wire fixing parts 130a and 130b of upper spring element 13a, and fixed by soldering.

In addition, the other ends (upper ends) of suspension wires 30C and 30D are respectively inserted to the pair of wire fixing parts 130a and 130b of upper spring element 13b, and fixed by soldering.

On the other hand, one ends (lower ends) of suspension wires 30A and 30B are inserted to first through holes 260a of first wire connecting part 260s of first lead elements 26a and 26b, and fixed by soldering.

In addition, one ends (lower ends) of suspension wires 30C and 30D are inserted to second through holes 265a of second wire connecting parts 265 of second lead elements 26c and 26d, and fixed by soldering.

In addition, by applying adhesive agent to the portion surrounded by base leg part 257 in lead installation space 256 of base main body 25a, base main body 25a and cover 4 are fixed to each other. The adhesive agent is applied also to the rear surfaces of first wire connecting parts 260 of first lead elements 26a and 26b and the rear surfaces of second wire connecting parts 265 of second lead elements 26c and 26d. In this state, first wire connecting part 260 and second wire connecting part 265 function as anchors, and thus the bonding power in attaching of cover 4 to base main body 25a and the dropping-impact resistance is improved.

In the above-mentioned manner, OIS movable part 10 is supported by OIS fixing part 20 with suspension wires 30A to 30D in such a manner that OIS movable part 10 can sway in the plane orthogonal to the optical axis.

At the time of shake correction in lens driving device 1, OIS coils 22A to 22D are energized. When OIS coils 22A to 22D are energized, Lorentz forces are generated at OIS coils 22A to 22D by interaction between the magnetic field of magnet part 125 and the current flowing through OIS coils 22A to 22D (Fleming's left hand rule).

The directions of the Lorentz force (the V direction or the U direction) are orthogonal to the directions of the current (the U direction or the V direction) and the directions of the magnetic field at the long side portions of OIS coils 22A to 22D (the Z direction). Since OIS coils 22A to 22D are fixed, reactive forces act on permanent magnets 125A to 125D. With the reactive forces serving as the driving force of the OIS voice coil motor, OIS movable part 10 including magnet part 125 sways in the plane orthogonal to the optical axis, and thus shake correction is performed.

At the time of automatic focusing in lens driving device 1, AF coil part 111 is energized. When AF coil part 111 is energized, a Lorentz force is generated at AF coil part 111 by interaction between the magnetic field of magnet part 125 and the current flowing through AF coil part 111.

The direction of the Lorentz force (the Z direction) is orthogonal to the direction of the current flowing through AF coil part 111 and the direction of the magnetic field. Since magnet part 125 is fixed, a reactive force acts on AF coil part 111.

With this reactive force serving as the driving force of the AF voice coil motor, AF movable part 11 including AF coil part 111 moves in the Z direction (optical axis direction), and thus focusing is performed.

Overview of Present Embodiment

Lens driving device 1 according to the present embodiment is configured to correct a shake by moving OIS movable part 10 holding a lens barrel (not illustrated) in a direction (e.g., the X direction and the Y direction) orthogonal to an optical axis, the lens driving device 1 including: OIS fixing part 20 disposed away from OIS movable part 10 on an imaging side in an optical axis direction (the − side in the Z direction); cover 4 configured to cover OIS movable part 10 at least on a light reception side in the optical axis direction (the + side in the Z direction); and a plurality of suspension wires 30A to 30D configured to support OIS movable part 10 with respect to OIS fixing part 20 such that OIS movable part 10 is displaceable in the direction orthogonal to the optical axis, each of the plurality of suspension wires 30A to 30D extending along the optical axis direction such that a first end of the suspension wire is fixed to OIS fixing part 20 and that a second end of the suspension wire is fixed to OIS movable part 10. OIS movable part 10 includes damper 15 composed of a viscous fluid and disposed so as to make contact with the plurality of suspension wires 30A to 30D, stopper protrusion 121 provided on a surface on the light reception side such that stopper protrusion 121 protrudes in the optical axis direction in a region near a portion where the second end of the suspension wire is fixed and that an end of stopper protrusion 121 faces an inner surface of cover 4 in the optical axis direction, and flow stopper part 121a capable of stopping flow damper 15 flowing toward the end of stopper protrusion 121.

Operation and Effect of Present Embodiment

With lens driving device 1 of the present embodiment having the above-mentioned configuration, adhesion of damper 15 to tip end surface 121b of stopper protrusion 121 can be prevented. Specifically, in lens driving device 1 of the present embodiment, stopper protrusion 121 includes flow stopper part 121a at the side surface thereof. Flow stopper part 121a is provided at the surface that serves as a path of damper 15 moving to the + side in the Z direction in the side surface of stopper protrusion 121, and thus flow stopper part 121a serves as a resistance against displacement of damper 15 along the direction of arrow a of FIG. 11 toward the + side in the Z direction on the side surface of stopper protrusion 121, for example. As a result, adhesion of damper 15 to tip end surface 121b of stopper protrusion 121 is reduced or prevented.

Specifically, even when damper 15 moves to the + side in the Z direction in a washing process for removing a powdery material and the like adhered to camera module A, adhesion of moved damper 15 to tip end surface 121b of stopper protrusion 121 less occurs.

In addition, with lens driving device 1 of the present embodiment, the effective length of suspension wire 30 can be ensured. That is, in the present embodiment, one ends (lower ends) of suspension wires 30 are fixed to first wire connecting parts 260 of first lead elements 26a and 26b and second wire connecting parts 265 of second lead elements 26c and 26d exposed at the four corners of base member 25. In view of this, it is possible to achieve a larger effective length of suspension wire 30 in comparison with a structure in which one ends (lower ends) of suspension wires 30 are fixed to a member (e.g., coil substrate 21 or the like) disposed at a position nearer to OIS movable part 10 (i.e., on the + side in the Z direction) relative to base member 25 as disclosed in PTL 1.

In particular, in the present embodiment, first wire connecting parts 260 and second wire connecting parts 265 of lead 26 are disposed at positions remote from OIS movable part 10 (that is on the − side in the Z direction) relative to first lead main bodies 261 and second lead main bodies 266 embedded in base member 25. Accordingly, it is possible to achieve a larger effective length of suspension wire 30 in comparison with the structure in which first wire connecting part 260 and second wire connecting part 265 are disposed at the same position as first lead main body 261 and second lead main body 266 in the Z direction.

In addition, with lead 26 having the above-mentioned structure, first wire connecting part 260 and second wire connecting part 265 can be disposed at positions remote from OIS movable part 10 with first lead main body 261 and second lead main body 266 completely embedded in base member 25. Thus, it is possible to achieve a larger effective length of suspension wire 30 while achieving the improvement of the coupling power of lead 26 to base member 25.

As described above, with lens driving device 1 of the present embodiment, the reliability of lens driving device 1 is improved since the effective length of suspension wire 30 can be ensured, and the rupture of suspension wire 30 due to metal fatigue can be reduced.

Supplementary Note

While the invention made by the present inventor has been specifically described based on the preferred embodiment, it is not intended to limit the present invention to the above-mentioned preferred embodiment but the present invention may be further modified within the scope and spirit of the invention defined by the appended claims.

While smartphone M serving as a camera-equipped mobile terminal is described in the embodiment as an example of a camera mounting device having camera module A, the present invention is applicable to a camera mounting device serving as an information apparatus or a transport apparatus. The camera mounting device serving as an information apparatus is an information apparatus including a camera module and a control section that processes image information obtained with the camera module, such as a camera-equipped mobile phone, a note-type personal computer, a tablet terminal, a mobile game machine, a webcamera, and a camera-equipped in-vehicle apparatus (such as a rear-view monitor apparatus and a drive recorder apparatus). In addition, the camera mounting device serving as a transport apparatus is a transport apparatus, such as an automobile, including a camera module and a control section that processes an image obtained with the camera module.

Figure 23A:
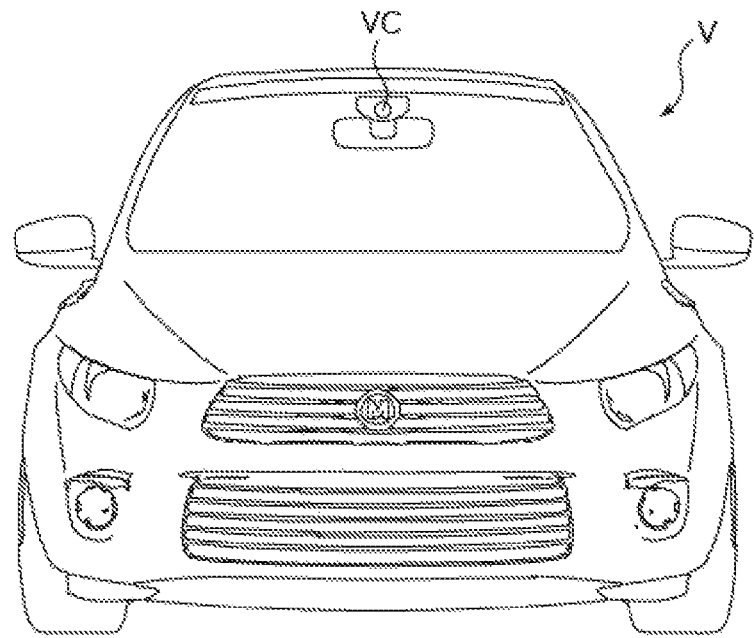
FIGS. 23A and 23B illustrate an automobile as a camera mounting apparatus for mounting an in-vehicle camera module.
Figure 23B:
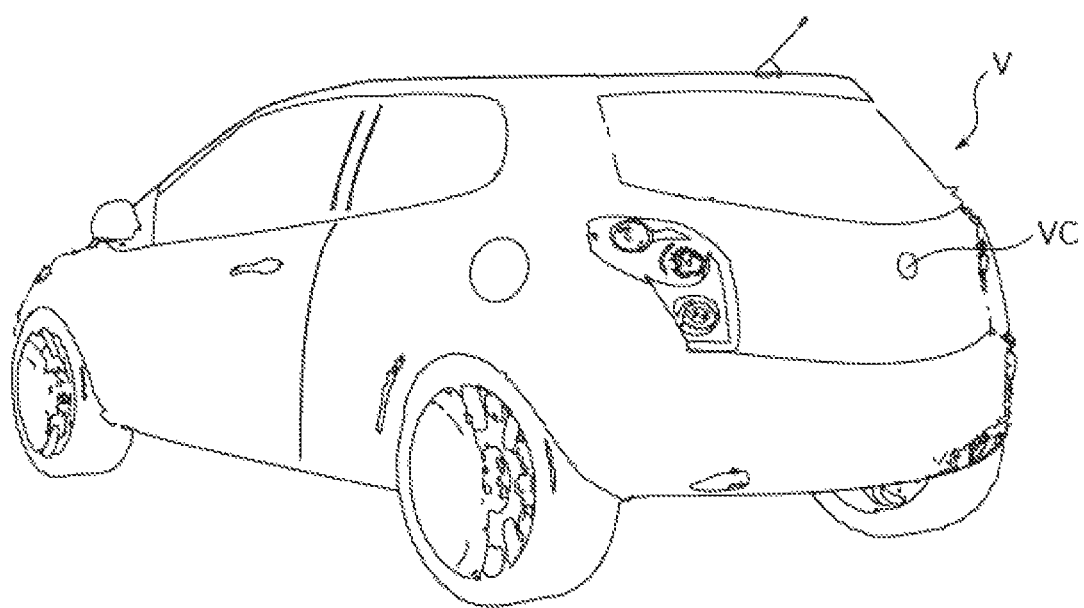

FIGS. 23A and 23B illustrate automobile V serving as a camera mounting device in which an in-vehicle camera module vehicle camera (VC) is mounted. FIG. 23A is a front view of automobile V, and FIG. 23B is a rear perspective view of automobile V. In automobile V, camera module A described in the embodiment is mounted as in-vehicle camera module VC. As illustrated in FIGS. 23A and 23B, in-vehicle camera module VC is attached to the windshield so as to face the front side, or attached to the rear gate so as to face the rear side, for example. This in-vehicle camera module VC is used for a rear-view monitor, a drive recorder, collision-avoidance control, automatic operation control, and the like.

The embodiment disclosed herein is merely an exemplification and should not be considered as limitative. The scope of the present invention is specified by the following claims, not by the above-mentioned description. It should be understood that various modifications, combinations, sub-combinations and alterations may occur depending on design requirements and other factors in so far as they are within the scope of the appended claims or the equivalents thereof.

This application is entitled to and claims the benefit of Japanese Patent Application No. 2017-148084 filed on Jul. 31, 2017, the disclosure of which including the specification, drawings and abstract is incorporated herein by reference in its entirety.

INDUSTRIAL APPLICABILITY

The lens driving device, the camera module, and the camera mounting apparatus according to the embodiment of the present invention can be mounted in a slim-camera-mounting apparatus such as a smartphone, a mobile phone, a digital camera, a note-type personal computer, a tablet terminal, a mobile game machine, and an in-vehicle camera.

REFERENCE SIGNS LIST

A Camera module
M Smartphone
1 Lens driving device
10 OIS movable part
11 AF movable part
110 Lens holder
110a Lens housing part
110b Upper flange
110c Lower flange
110d Coil winding part
110e Upper protruding part
110f, 110h Upper spring fixing part
110g, 110i Upper boss
110j Lower protruding part
110k Lower spring fixing part
110m Lower boss
110n Tying part
111 AF coil part
12 AF fixing part
12a Magnet holder
120a Arc groove
120b Magnet cover part 120c Magnet installation part
120d Lower spring fixing part
120d1 Lower boss
120e1, 120e2 Upper spring fixing part
120f1, 120f2 Upper boss
120h1, 120h2, 120h3, 120h4 Wire insertion part
121, 121A, 121B, 121C, 121D Stopper protrusion
121a Flow stopper part
121b Tip end surface
121c Inner surface
121d Center inner surface
121e Side inner surface
121f Outer surface
121g Outer recessed surface
121h, 121h1, 121h2, 121h3, 121h4 Wire opposing surface
121i, 121i1, 121i2, 121i3, 121i4 Side outer surface
121k, 121k1 First opposing surface
121m, 121m1 Second opposing surface
121n, 121n1 Stopper step
121p, 121p1 Side first surface
121q, 121q1 Side second surface
121r, 121r1 Side stopper step
121s1 Flow stop protrusion
121s2 Side flow stop protrusion
121t1 Flow stopper groove
121t2 Side flow stopper groove
121u1 Grain formation part
121u2 Side grain formation part
125 Magnet part
125A, 125B, 125C, 125D Permanent magnet
13 Upper elastic supporting part (Upper leaf spring)
13a, 13b Upper spring element
130 Outer fixing part
130a, 130b Wire fixing part
130c, 130d Outer first through hole
130e Outer second through hole
131 Inner fixing part
131a Inner through hole
132 Displacement permission part
132a, 132b Displacement permission element
132c, 132d Meandering part
14 Lower elastic supporting part (Lower leaf spring 14)
14a1, 14a2, 14a3, 14a4 Outer fixing part
140 Outer through hole
14b Inner fixing part
14c1, 14c2, 14c3, 14c4 Displacement permission part
141 Meandering part
142 Inner through hole
15 Damper
20 OIS fixing part
21 Coil substrate
21a Chamfered part
21b Opening
21c First cutout
21d Second cutout
22 OIS coil part
22A, 22B, 22C, 22D OIS coil
23A, 23B Hall device
24 FPC
240 FPC main body
241 Chamfered part
242 Opening
243 First cutout
244 Second cutout
245 Terminal part
25 Base member
25a Base main body
250 Opening
250a Through hole
251 Terminal attaching portion
252 First protrusion
253 Second protrusion
254a, 254b Hall device recess
255 Lead cutout part
256 Lead installation space
257 Base leg part
258 Second base leg part
259 First reinforcement rib
26 Lead
26a, 26b First lead element
260 First wire connecting part
260a First through hole
261 First lead main body
261a First main body element
261b Positioning hole
261c First main body element
261d Positioning hole
262 Conduction piece
263a, 263b First step
26c, 26d Second lead element
265 Second wire connecting part
265a Second through hole
266 Second lead main body
266a Positioning hole
267 Second step
30 OIS supporting part (suspension wire)
30A, 30B, 30C, 30D Suspension wire
4 Cover
40 Opening
41 Top plate part

What is claimed is:

1. A lens driving device configured to correct a shake by moving a movable part holding a lens barrel in a direction orthogonal to an optical axis, the lens driving device comprising:
a fixing part disposed away from the movable part on an imaging side in an optical axis direction;
a cover configured to cover the movable part at least on a light reception side in the optical axis direction; and
a plurality of suspension wires configured to support the movable part with respect to the fixing part such that the movable part is displaceable in the direction orthogonal to the optical axis, each of the plurality of suspension wires extending along the optical axis direction such that a first end of the suspension wire is fixed to the fixing part and that a second end of the suspension wire is fixed to the movable part,
wherein the movable part includes:
a damper composed of a viscous fluid and disposed so as to make contact with the plurality of suspension wires;
a stopper protrusion provided on a surface on the light reception side such that the stopper protrusion protrudes in the optical axis direction in a region near a portion where the second end of the suspension wire is fixed and that an end of the stopper protrusion faces an inner surface of the cover in the optical axis direction; and
a flow stopper part capable of stopping a flow of the damper flowing toward the end of the stopper protrusion,
wherein:
at the surface on the light reception side of the movable part, the stopper protrusion is provided inside, in a radial direction of the movable part, the portion where the second end of the suspension wire is fixed; and at a side surface of the stopper protrusion, the flow stopper part is provided at a first side surface that is an outer surface in the radial direction of the movable part and is opposite to the suspension wire, wherein the flow stopper part comprises one of:
- a side stopper step provided at a center part of the first side surface in the optical axis direction;
- a groove provided at a center part of the first side surface in the optical axis direction; and
- a protrusion provided at a center part of the first side surface in the optical axis direction; and wherein the flow stopper part serves as a resistance against displacement of the damper toward a front end portion of the stopper protrusion from a base end portion of the stopper protrusion in the optical axis direction along the first side surface of the stopper protrusion.

2. A camera module comprising:
the lens driving device according to claim 1;
a lens part that is held by the movable part of the lens driving device through a lens barrel; and
an image pickup part configured to pick up a subject image imaged by the lens part.

3. A camera mounting apparatus that is an information apparatus or a transporting apparatus, the camera mounting apparatus comprising:
the camera module according to claim 2; and
a control part configured to process image information obtained by the camera module.

4. A lens driving device according to claim 1; wherein
the stopper protrusion includes a pair of wire-opposing surface that are disposed on both sides of the first side surface in the width direction of the stopper protrusion, and
the flow stopper part is provided on each of the pair of wire-opposing surface.

* * * * *